United States Patent
Ohta et al.

(10) Patent No.: US 6,870,991 B2
(45) Date of Patent: Mar. 22, 2005

(54) FIBER-TYPE OPTICAL COUPLER WITH SLANTING BRAGG DIFFRACTION GRATINGS AND OPTICAL PARTS AND APPARATUSES USING THE SAME

(75) Inventors: Yoshinori Ohta, Tokyo (JP); Yutaka Urino, Tokyo (JP)

(73) Assignee: NEC Corporation, Tokyo (JP)

( * ) Notice: Subject to any disclaimer, the term of this patent is extended or adjusted under 35 U.S.C. 154(b) by 304 days.

(21) Appl. No.: 09/861,658

(22) Filed: May 22, 2001

(65) Prior Publication Data

US 2001/0046352 A1 Nov. 29, 2001

(30) Foreign Application Priority Data

May 22, 2000 (JP) ...................................... 2000/150031

(51) Int. Cl.[7] .............................................. G02B 6/26
(52) U.S. Cl. ........................................ 385/50; 385/37
(58) Field of Search ............................. 385/10, 27, 28, 385/31, 32, 37, 39, 42, 43, 50; 398/84, 87

(56) References Cited

U.S. PATENT DOCUMENTS

| | | | | |
|---|---|---|---|---|
| 5,061,032 A | * | 10/1991 | Meltz et al. ................... | 385/37 |
| 5,805,751 A | * | 9/1998 | Kewitsch et al. .............. | 385/43 |
| 6,360,038 B1 | * | 3/2002 | Grubsky ........................ | 385/28 |
| 6,567,587 B2 | * | 5/2003 | Kashihara et al. ............. | 385/37 |
| 6,606,432 B2 | * | 8/2003 | Gaylord et al. ................ | 385/37 |

FOREIGN PATENT DOCUMENTS

| | | | | | |
|---|---|---|---|---|---|
| JP | 02226233 A | * | 9/1990 | ............. | G02F/1/35 |
| JP | 09211241 A | * | 8/1997 | ............ | G02B/6/122 |

* cited by examiner

*Primary Examiner*—Edward J. Glick
*Assistant Examiner*—Chih-Cheng Glen Kao
(74) *Attorney, Agent, or Firm*—Young & Thompson

(57) ABSTRACT

A fiber-type optical coupler has two optical fibers including a core on which a slanting Bragg diffraction grating is formed and a first cladding and a second cladding bordered with a boundary plane close to the core. The two optical fibers are placed by approximating the boundary plane almost contacting the core, making respective optical axes almost parallel and also making slanting directions of the respective Bragg diffraction gratings almost parallel. A wave vector of the slanting Bragg diffraction grating is located in a plane made by a normal set up on the boundary plane almost contacting the core and the optical axis of the core, and an angle θ made by the wave vector and the optical axis is 0 degree<θ<90 degrees. In addition, a refractive index of the second cladding is lower than that of the first cladding.

8 Claims, 18 Drawing Sheets

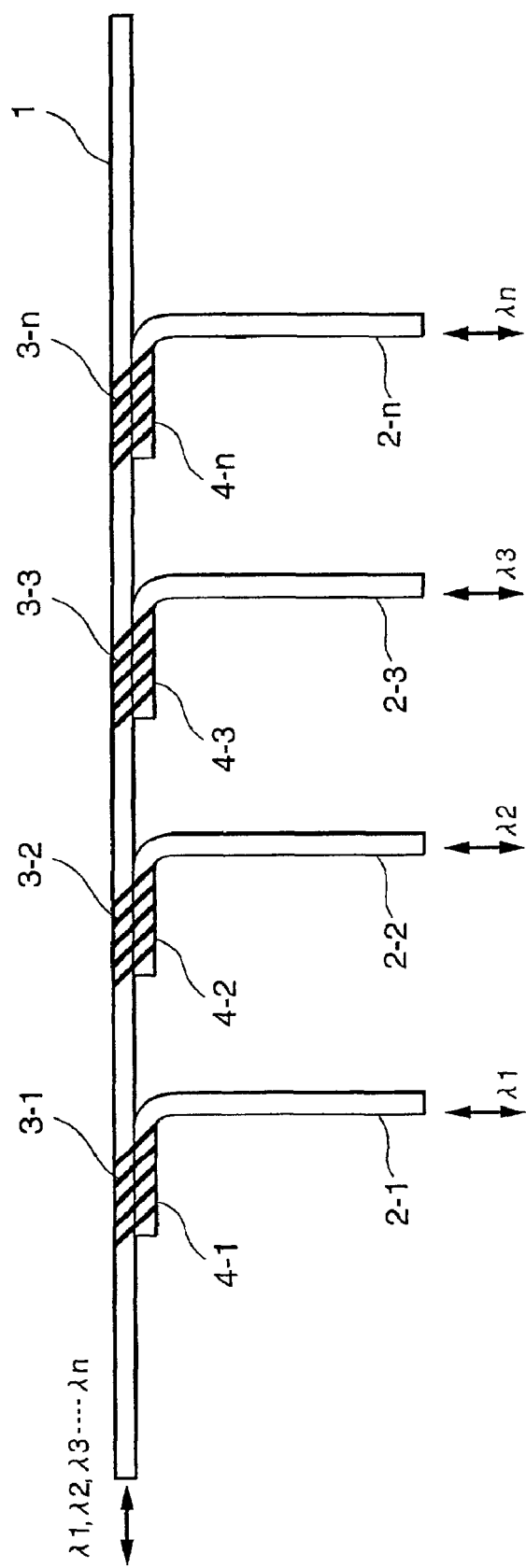

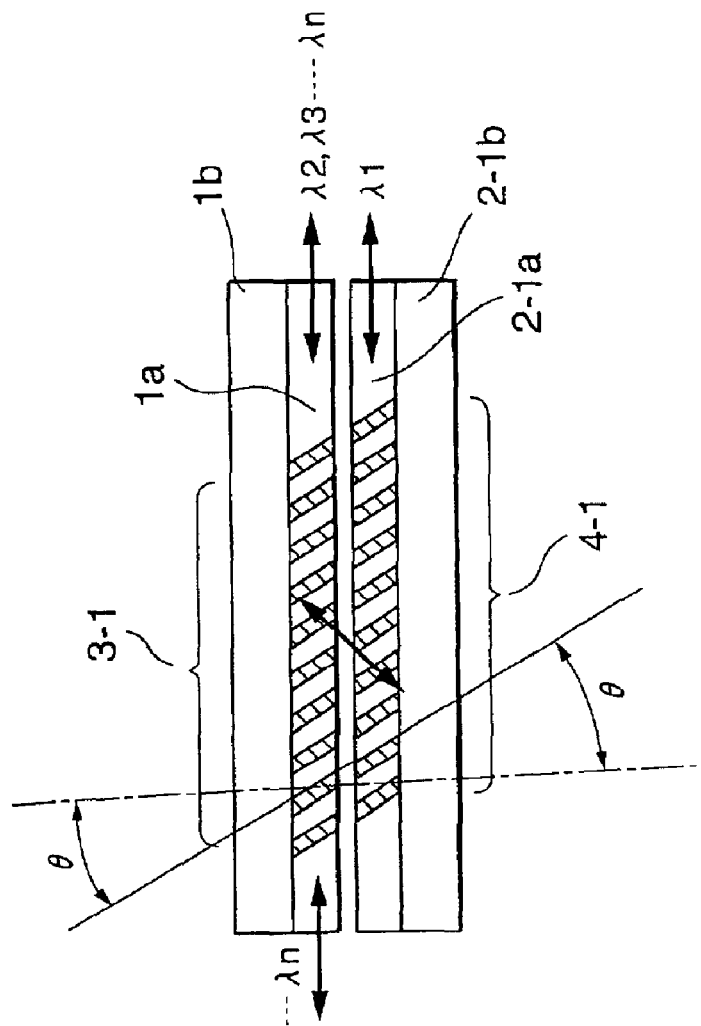
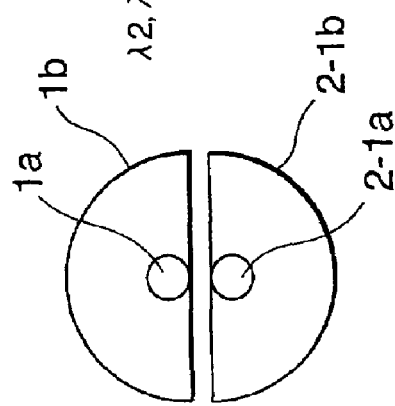

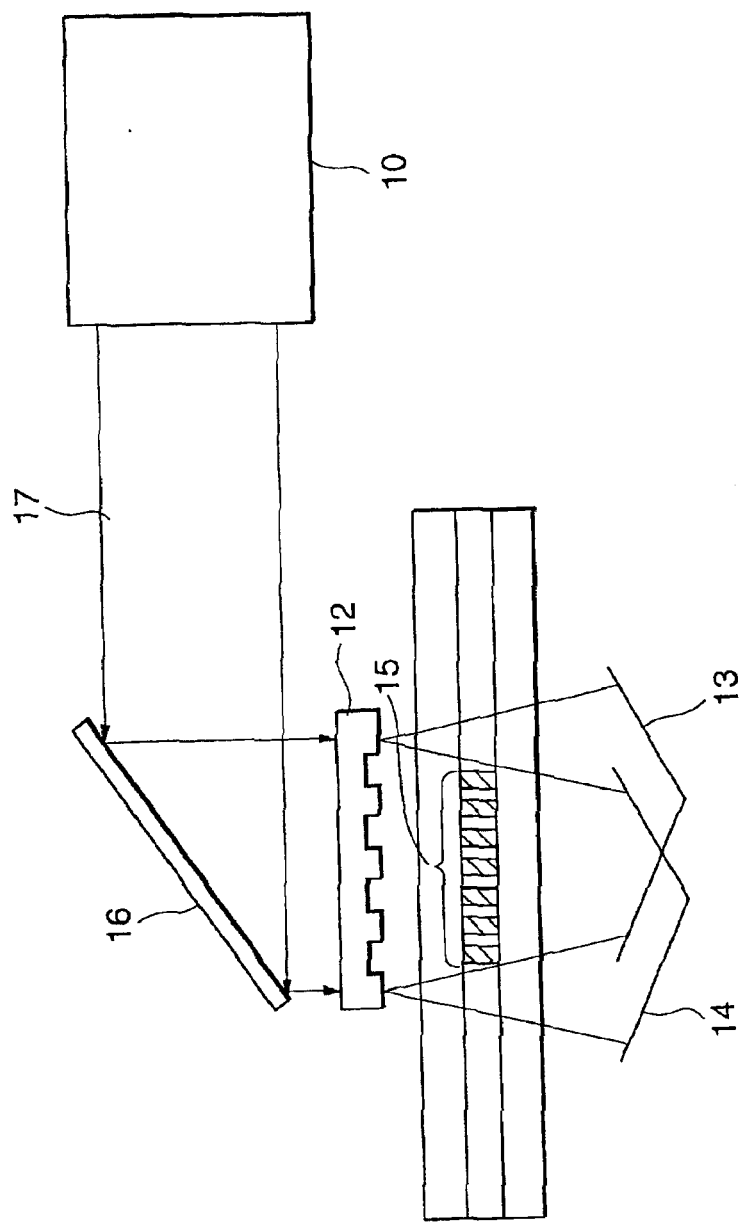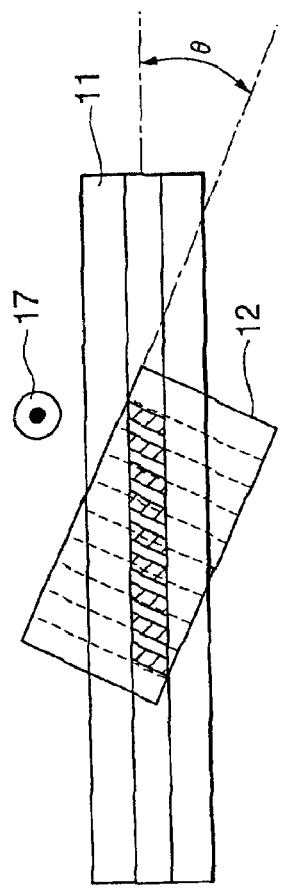
Fig.6A
Fig.6B

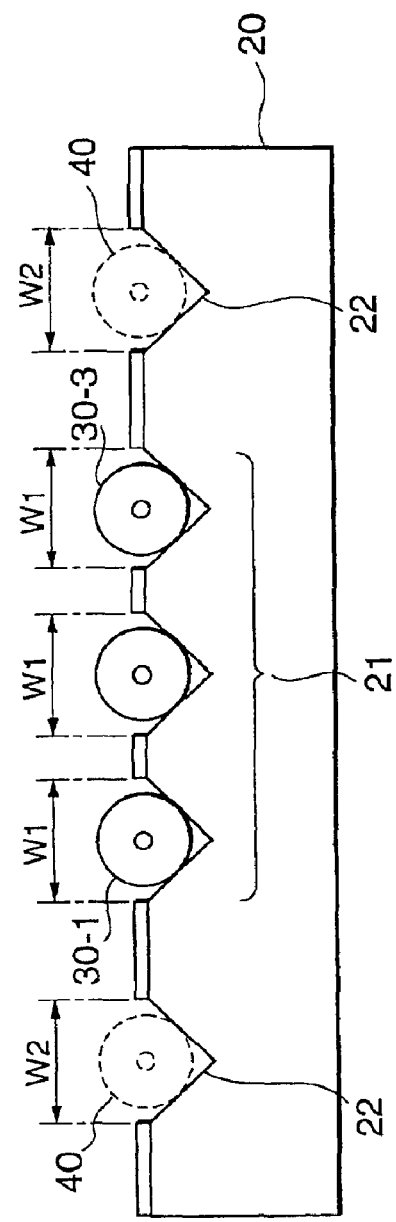
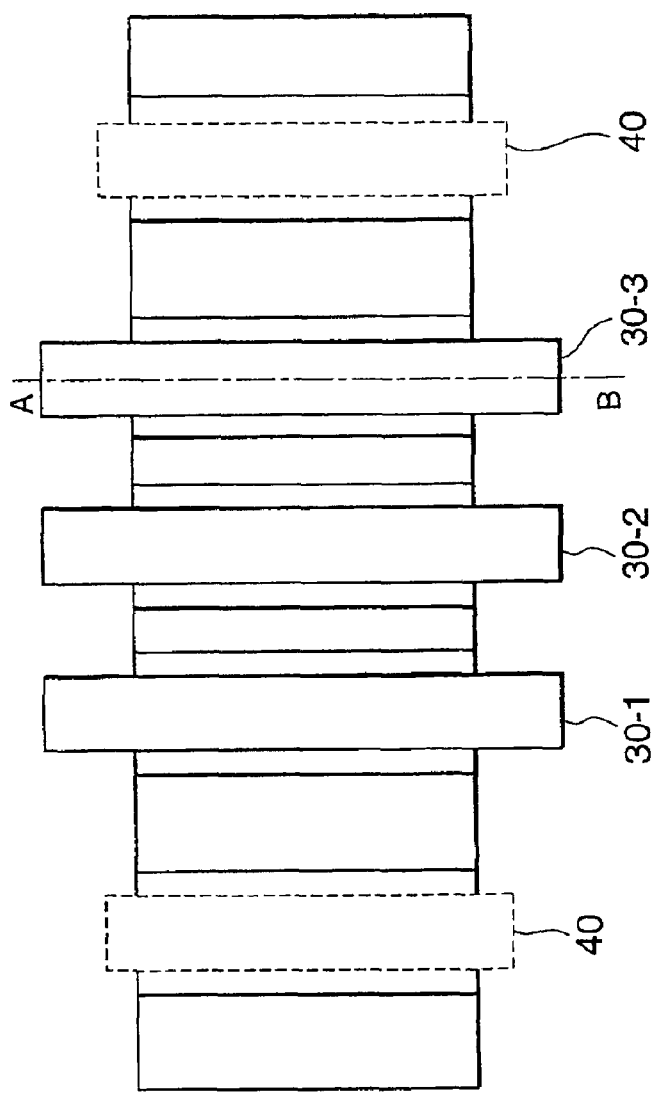

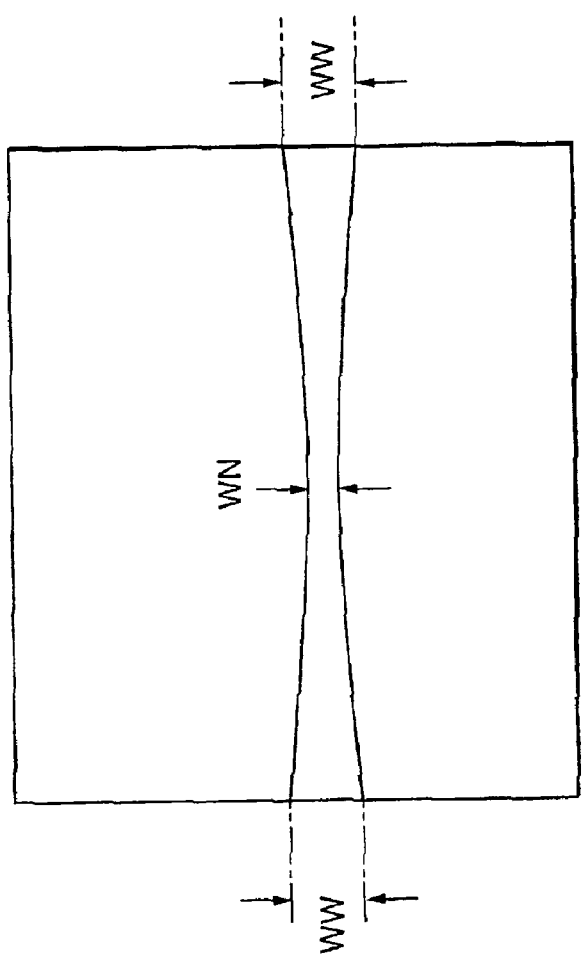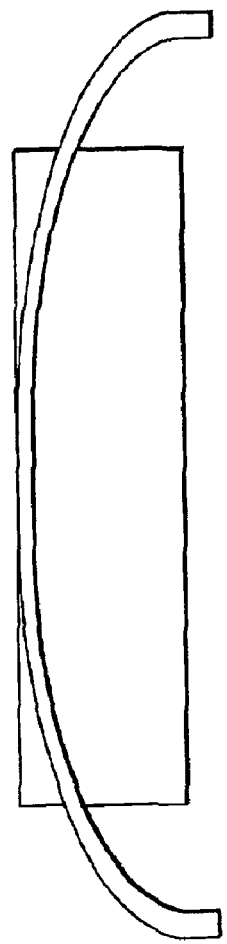
Fig.8A
Fig.8B

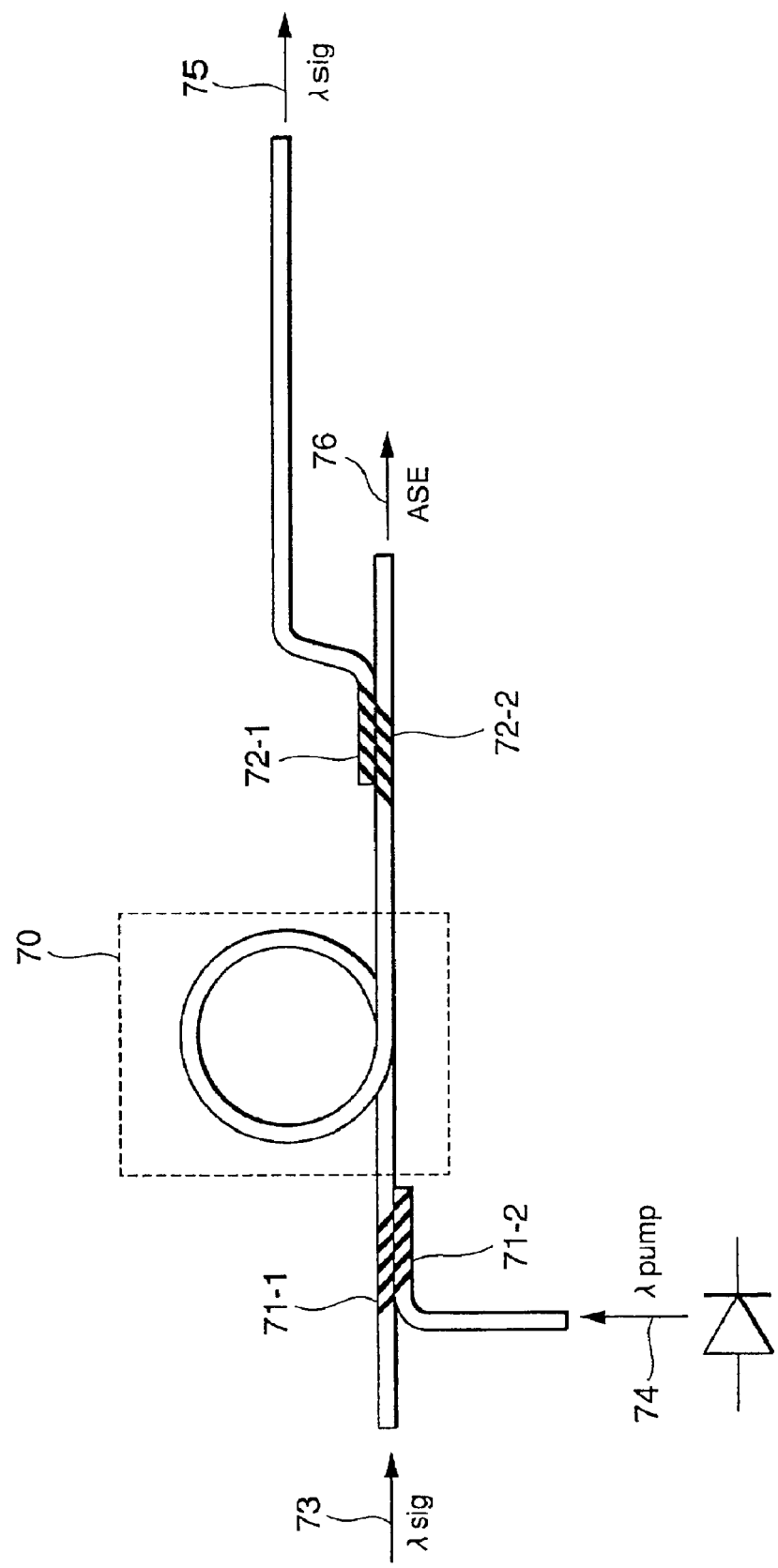

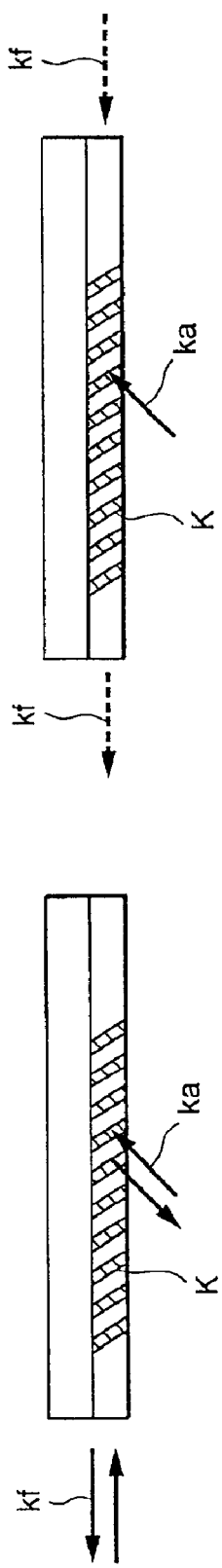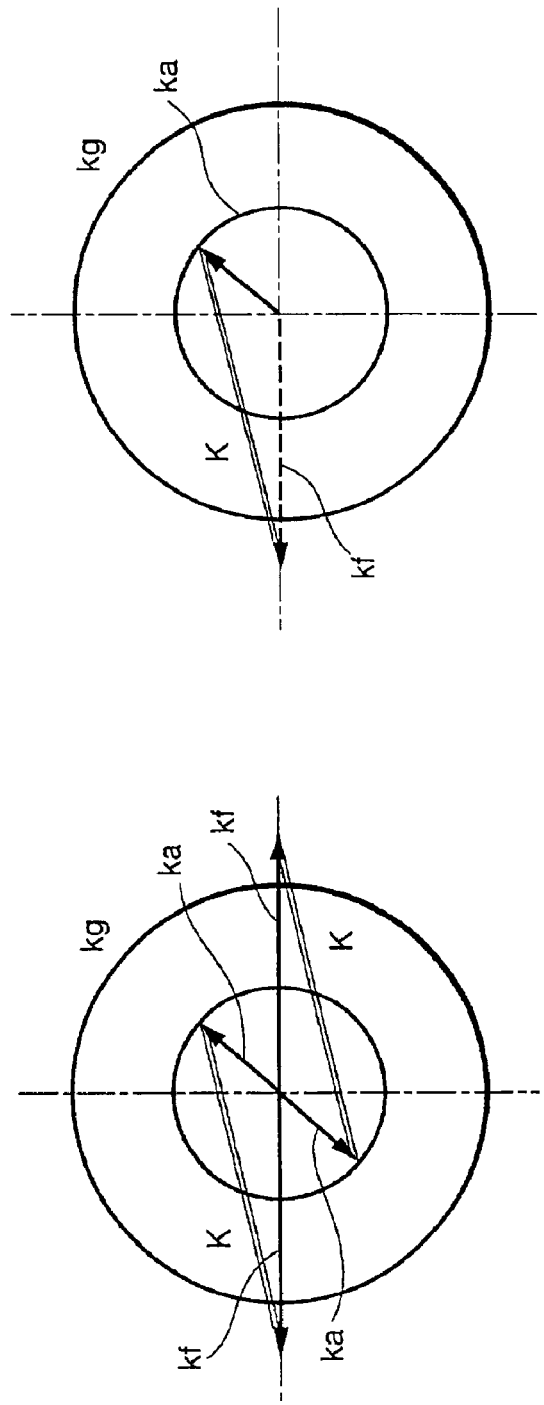

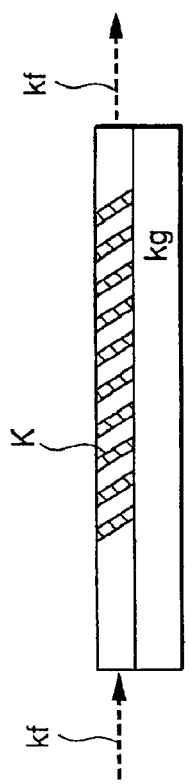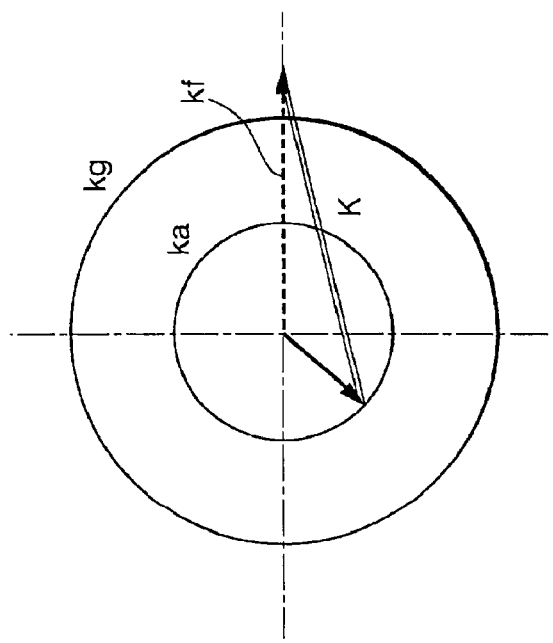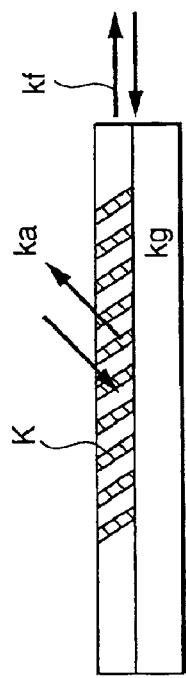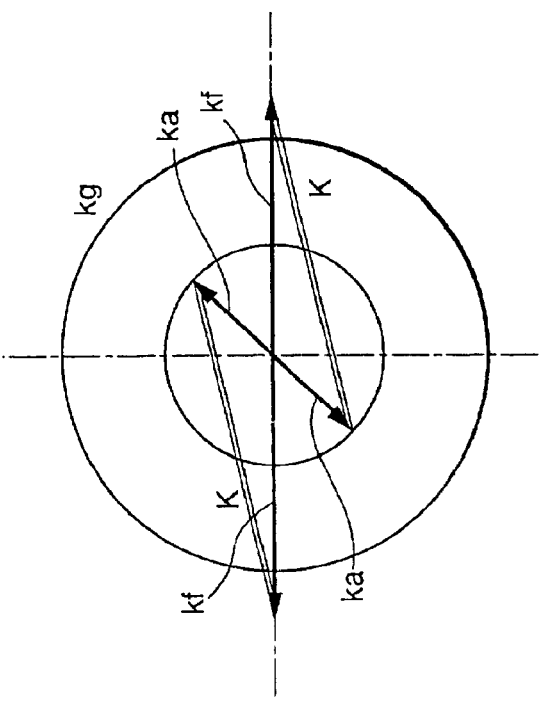
Fig.12A Fig.12B Fig.12A' Fig.12B'

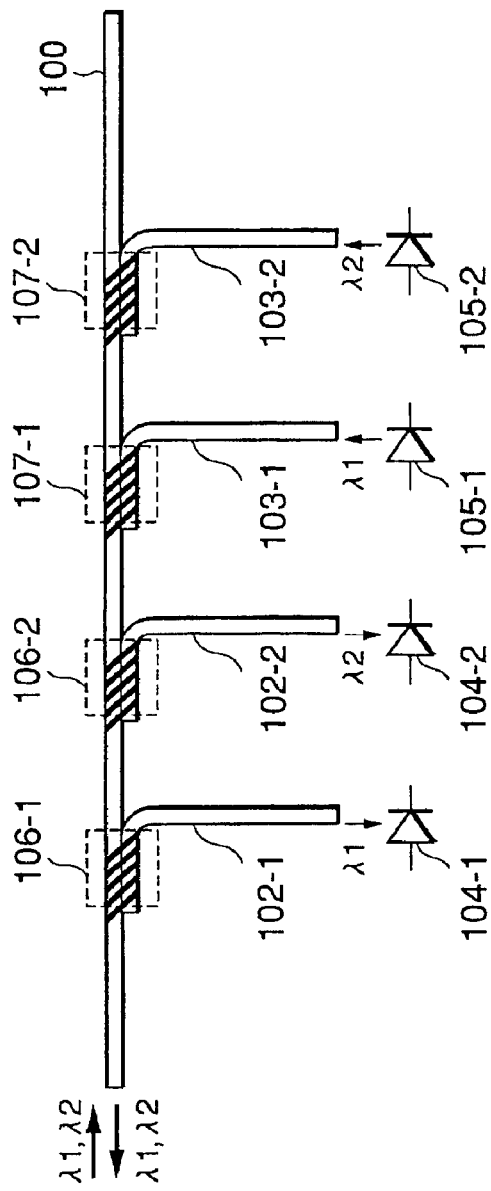
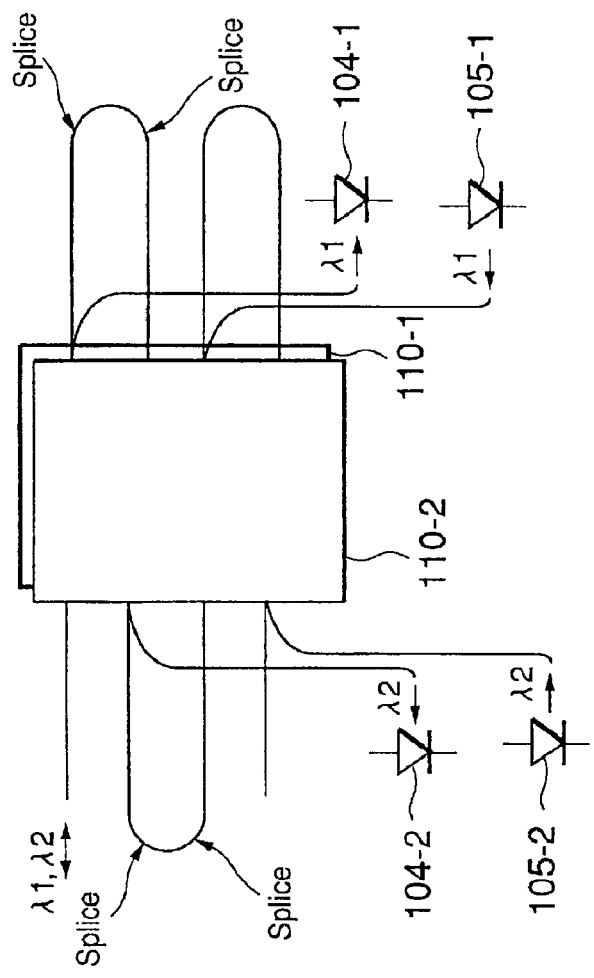
Fig.14A
Fig.14B

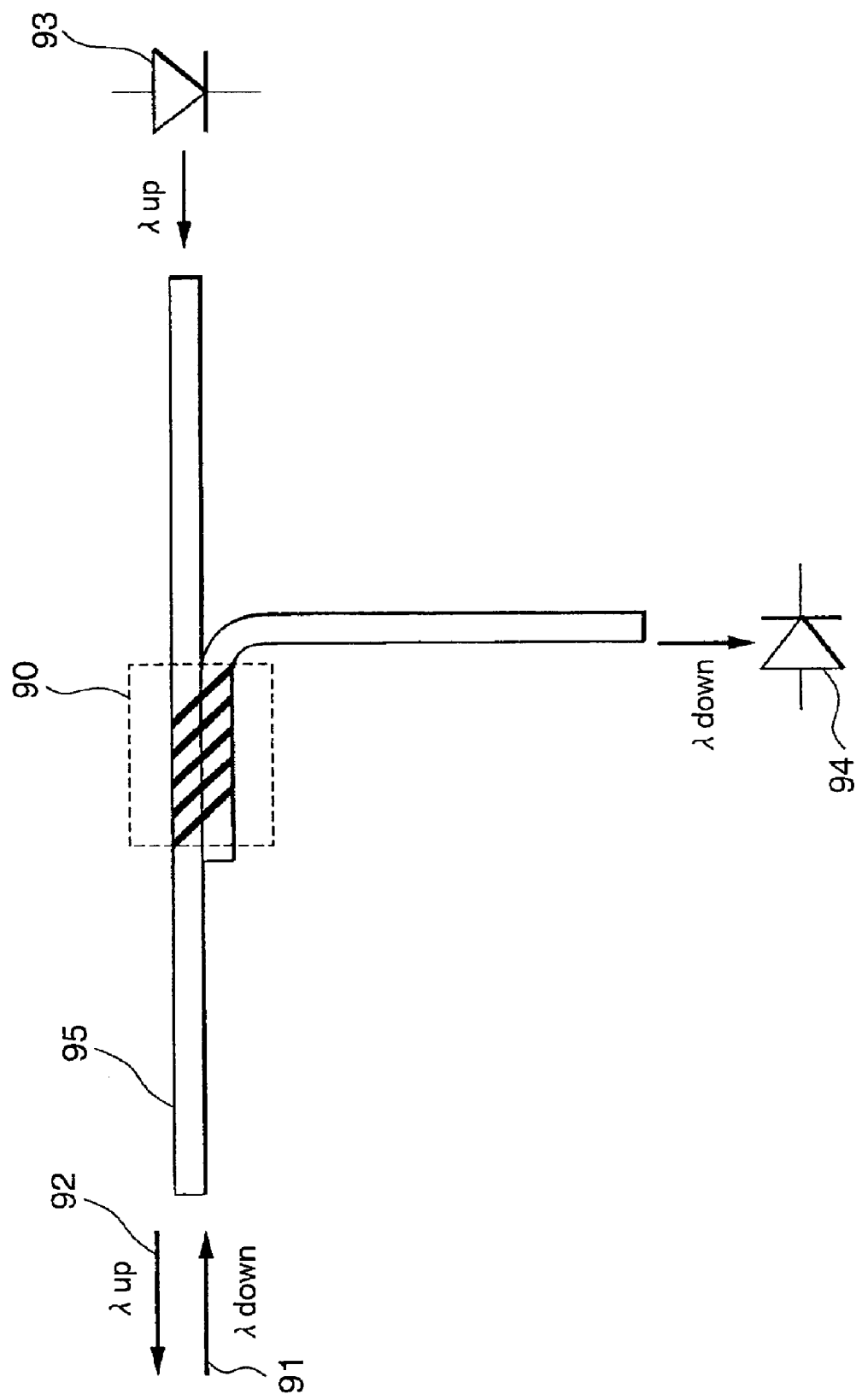

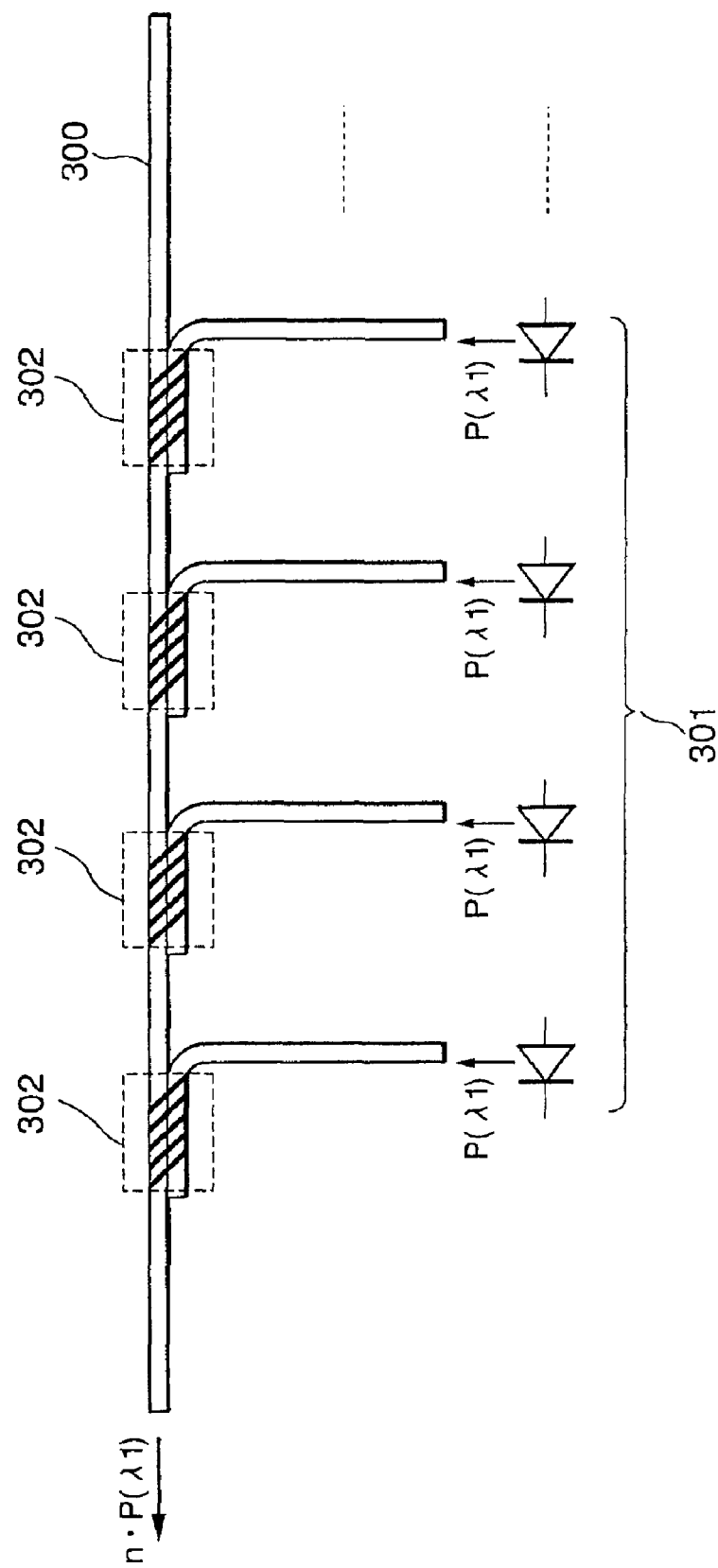

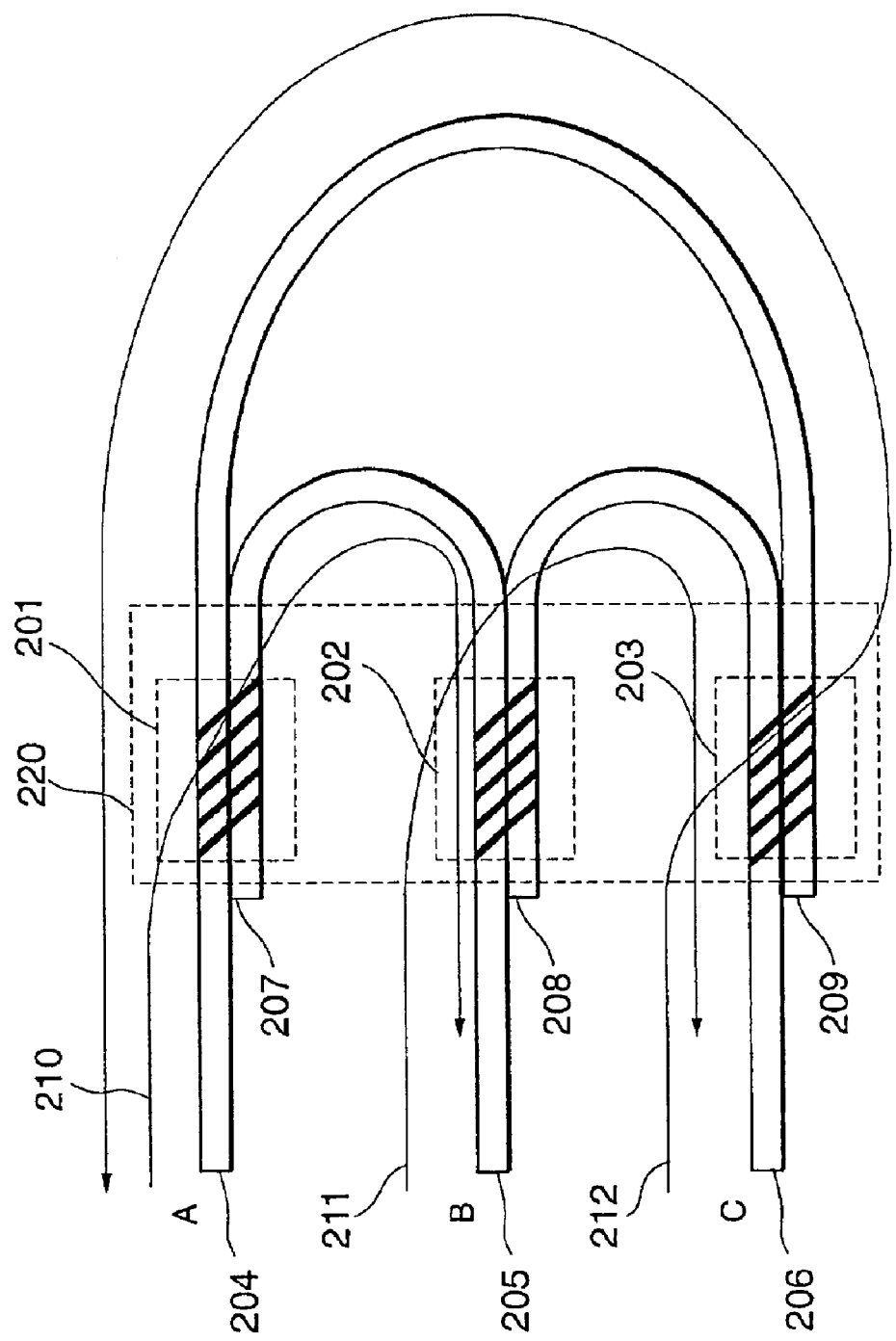

FIBER-TYPE OPTICAL COUPLER WITH SLANTING BRAGG DIFFRACTION GRATINGS AND OPTICAL PARTS AND APPARATUSES USING THE SAME

BACKGROUND OF THE INVENTION

1. Field of the Invention

The present invention relates to an optical coupler, optical parts and an optical apparatuses utilizing the optical coupler and also a method of manufacturing the optical coupler.

2. Description of the Prior Art

An explosive increase in communication traffic is also expected in the future due to the advent of an Internet society. And implementation of a network capable of accommodating the increase in communication traffic, which is large-capacity, high-speed and inexpensive as to communication costs is required. A network technology meeting such requirements is an optical fiber communication technology. In order to allow large capacity, high speed and inexpensiveness in the optical fiber communication technology, it is necessary to develop a multiplexing technology of high density. While a time division multiplex technology, a wavelength division multiplex technology and combined use of them are thinkable as a method of multiplexing, a direction to adopt the wavelength division multiplex technology (WDM) is mainstream from a viewpoint of easy extensibility. As a concrete approach, in the backbone system (basic network), a WDM technology of such high density as wavelength spacing of zero-point several nm and several tens of GHz for frequency spacing is developed. In the access system (subscriber network) and CATV network, review of methods are underway, such as a method of utilizing both 1.3-$\mu$m wavelength light and 1.55-$\mu$m light for two-way communication of descending and ascending links and a method of using the 1.55-$\mu$m light only for a descending link of a broad band signal while using the 1.3-$\mu$m light for two-way communication. Also, in the basic network, in addition to a point-to-point communication system, there are an optical add drop multiplexing (Optical ADM) system for putting signals in and out by wavelengths on a node on the way, an optical cross-connect (Optical XC) system for recombining lightwave paths and besides, an optical routing system for using wavelength information as address information to determine a destination of optical signals and so on so that implementation of a flexible network is expected.

Thus, the optical parts hold the key to implementation of an advanced optical communication system that utilizes wavelengths as a resource. One of the especially important optical parts is an optical multiplexer-demultiplexer, which multiplexes or demultiplexes light waves of different wavelengths to or from a transmission line optical fiber. Representative multiplexer-demultiplexers for high density wavelength multiplexing implemented by the conventional technology are an arrayed waveguide grating (AWG) and a fiber Bragg grating (FBG).

Moreover, as for the optical access system, PDS that performs two-way optical communication between a station and N (a plurality) subscribers via 1:N optical star couplers is a representative example of a network system. And one of technological challenges of the optical parts is that the star coupler sufficiently functions in a descending distribution system but ascending signals from the subscriber lines can only collect power of 1/N at the station in the ascending multiplexing system, which occupies a major portion of signal transmission loss, and so an optical multiplexer of N:1 capable of optical multiplexing with no loss is anticipated.

In addition, another technology requested to be developed in the optical access system is one that allows, in a high-performance and inexpensive manner, implementation of an optical transmission and reception module for two-way communication to be placed on an optical network unit (ONU) on the subscriber side.

In order to implement the above optical parts such as an optical circulator, a 1:N optical coupler and an optical transmission and reception module, it is necessary to develop a new technology that has a nonreciprocal transmission property and yet is implemented at low cost.

Furthermore, the optical parts that are important in implementing the optical communication system are those utilizing the nonreciprocal transmission property of light. The aforementioned optical circulator is also one of the representative nonreciprocal optical parts. The optical circulator is required not only in the above-mentioned form of utilization but also in the case of configuring an optical ADM system for branching light from transmission lines to nodes (terminal equipment) without loss and inversely inserting light signals from the nodes to the transmission lines.

The above-mentioned conventional multiplexer-demultiplexer devices are a device system that artfully utilizes optical interference on a waveguide optical circuit and is configured in a relatively small size with high wavelength resolving power. However, the devices have common faults, that is, they are sensitive to temperature change, increase in optical insertion loss due to connection between the devices and optical fibers cannot be ignored, and they are expensive.

In addition, to embody the optical parts and apparatuses that require the nonreciprocal transmission property including the optical circulator, optical multiplexer with no loss, and optical transmission and reception module mentioned in the above prior art, it cannot be helped, considering the current technological level, to rely on a method of using Faraday polarization rotation effect of magneto-optic materials. Thus, they must be configured by many discrete elements such as lenses and magneto-optic crystals so that they are too expensive and unstable to be practical.

SUMMARY OF THE INVENTION

Therefore, an object of the present invention is to provide a fiber-type optical coupler that is an optical device for implementing an advanced optical communication system utilizing wavelengths as a resource, optical parts of which configuration using this coupler is highly reliable, stable and economical and a method of manufacturing them as well as various optical apparatuses utilizing this fiber-type optical coupler.

The fiber-type optical coupler of the present invention is comprised of the same two optical fibers and couples light from one optical fiber to the other optical fiber, where the optical fiber has a core on which a slanting Bragg diffraction grating is formed and two claddings of different refractive indexes bordered with a plane parallel with an optical axis of the core and almost contacting the core. A wave vector of the slanting Bragg diffraction grating is located in a plane made by a normal set up on the border of the plane almost contacting the core and the optical axis, where an angle θ made by the wave vector and the optical axis is 0 degree <θ<90 degrees, and the two optical fibers are placed by approximating the plane almost contacting the core, making the respective optical axes almost parallel and also making slanting directions of the respective Bragg diffraction gratings almost parallel so that, as for the refractive indexes of the two claddings bordered with the plane almost contacting the core, the refractive index of the cladding included in the area where the core exists from the plane is higher than that of the cladding included in the area where the core does not exist.

A manufacturing method of the fiber-type optical coupler of the present invention has a first process of forming, in the optical fiber of which core is surrounded by claddings, a Bragg diffraction grating by periodic change of the refractive index whereby angle θ made by the wave vector and the optical axis of the optical fiber is 0 degree <θ<90 degrees, a second process of forming, in a section vertical to the plane made by the wave vector and the optical axis and also vertical to the optical axis of the optical fiber, a first Bragg diffraction grating fiber having a first cladding and a second cladding of which refractive index is lower than that of the first cladding, bordered with a line drawn by approximating the core, and a third process of placing the first Bragg diffraction grating fiber and a second Bragg diffraction grating fiber having the same configuration as the first Bragg diffraction grating fiber by making the respective optical axes almost parallel and also making slanting directions of the respective Bragg diffraction gratings almost parallel and also approximating boundary planes of the first and second claddings. And in the third process, the first and second Bragg diffraction grating fibers are accommodated and fixed in grooves formed on substrates respectively, and the respective substrates have means for placing the first and second tilt Bragg grating fibers by making the respective optical axes thereof almost parallel and approximating boundary planes of the respective first and second claddings.

In addition, the optical part using the fiber-type optical coupler of the present invention has a plurality of fiber-type optical couplers of different wavelengths to meet Bragg conditions of the Bragg diffraction gratings and are concatenated so that the slanting directions of the Bragg diffraction gratings become the same as the direction of optical transmission in the plurality of fiber-type optical couplers. This optical part performs operation of a multiplexer-demultiplexer. In addition, the optical part having a plurality of fiber-type optical couplers meeting Bragg conditions of the Bragg diffraction gratings shows a property of optical multiplexing with no loss.

The other optical part using the fiber-type optical coupler has N tiers of (N is a positive integer of 2 or more) fiber-type optical couplers of the same wavelengths to meet Bragg conditions of the Bragg diffraction gratings. And in an optical input-output state wherein the light is inputted from one fiber terminal of the first optical fiber of the fiber-type optical coupler and the light is outputted from the second optical fiber thereof, if the optical input terminal of the first optical fiber is a terminal A, the other terminal of the first optical fiber is a terminal C, and the optical output terminal of the second optical fiber is a terminal B, then the terminal A of the fiber-type optical coupler on each tier is an optical input-output port, the terminal B of the fiber-type optical coupler on the N=i-th tier is connected to the terminal C of the fiber-type optical coupler on the N=i+1-th tier, and the terminal B of the fiber-type optical coupler on the last N=N-th tier is connected to the terminal C of the fiber-type optical coupler on the N=1-th tier. This optical part performs operation of an optical circulator. Moreover, the optical part of which optical input port is the terminal C of the fiber-type optical coupler and optical output port is the terminal A performs operation of an optical isolator.

Furthermore, as for the optical apparatus using the fiber-type optical coupler of the present invention, a semiconductor laser for transmissions connected to the terminal C of the fiber-type optical coupler, the terminal A thereof is the optical input-output port to an optical transmission line, and a photo-detector for reception is connected to the terminal B thereof. This apparatus performs operation of an optical transmitter/receiver.

The other optical apparatus has an optical amplification fiber for directly amplifying signal light, a pumping source for optically pumping the optical amplification fiber, the first and second fiber-type optical couplers for making the wavelength of the signal light meet the Bragg condition of the Bragg diffraction grating and the third fiber-type optical coupler for making the wavelength of the pumping source meet the Bragg condition of the Bragg diffraction grating, where the terminal A of the first fiber-type optical coupler is the input terminal of the signal light, the terminal B is connected to the terminal C of the third fiber-type optical coupler, the terminal A of the third fiber-type optical coupler is connected to the pumping source, the terminal B of the third fiber-type optical coupler is connected to one terminal of the optical amplification fiber, and the other terminal of the optical amplification fiber is connected to the terminal A of the second fiber-type optical coupler, and the terminal B of the second fiber-type optical coupler is a signal output terminal. This apparatus performs operation of an optical amplifier. Moreover, it has the second pumping source and the fourth fiber-type optical coupler for making the output wavelength of the second pumping source meet the Bragg condition of the Bragg diffraction grating, where the other terminal of the optical amplification fiber is connected to the terminal B of the fourth fiber-type optical coupler, the second pumping source is connected to the terminal A of the fourth fiber-type optical coupler, and the terminal C of the fourth fiber-type optical coupler can also be connected to the terminal A of the second fiber-type optical coupler.

BRIEF DESCRIPTION OF THE DRAWINGS

The above and other objects, features and advantages of the present invention will become apparent from the following detailed description when taken with the accompanying drawings in which:

FIG. 3 is a diagram showing a structure of the multiplexer-demultiplexer that is a first embodiment of the present invention;

FIGS. 4A and 4B are diagrams showing structures of a fiber-type optical coupler that is a basic device for implementing various optical parts and apparatuses for optical communication of the present invention;

FIGS. 6A and 6B are diagrams for describing how to form a grating of the fiber-type optical coupler of the present invention;

FIGS. 7A, 7B and 7C are diagrams for describing how to assemble and implement the fiber-type optical coupler of the present invention;

FIGS. 8A and 8B are diagrams showing another configuration of a silicon V groove used for assembling and implementing the fiber-type optical coupler of the present invention;

FIG. 10 is a block diagram of an optical fiber amplifier using the fiber-type optical coupler, which is a second embodiment of the present invention;

FIGS. 11A, 11B, 11A' and 11B' are diagrams for describing operating principles of an optical irreversible transmission property of the fiber-type optical coupler of the present invention;

FIGS. 12A, 12B, 12A' and 12B' are diagrams for describing operating principles of the optical irreversible transmission property of the fiber-type optical coupler of the present invention;

FIGS. 14A and 14B are diagrams of a configuration and a structure of an optical transmitter/receiver module using the optical reversible transmission property of the fiber-type optical coupler, which is a third embodiment of the present invention;

FIG. 15 is a block diagram of the transmitter/receiver by means of 1 wave using the same wavelength for transmission and reception by use of the fiber-type optical coupler, which is a fourth embodiment of the present invention;

FIG. 16 is a block diagram of an optical multiplexer with no loss using the optical irreversible transmission property of the fiber-type optical coupler, which is a fifth embodiment of the present invention;

FIG. 17 is a block diagram of a 3-port optical circulator using the optical irreversible transmission property of the fiber-type optical coupler, which is a sixth embodiment of the present invention.

DETAILED DESCRIPTION OF THE PREFERRED EMBODIMENTS

Figure 1:
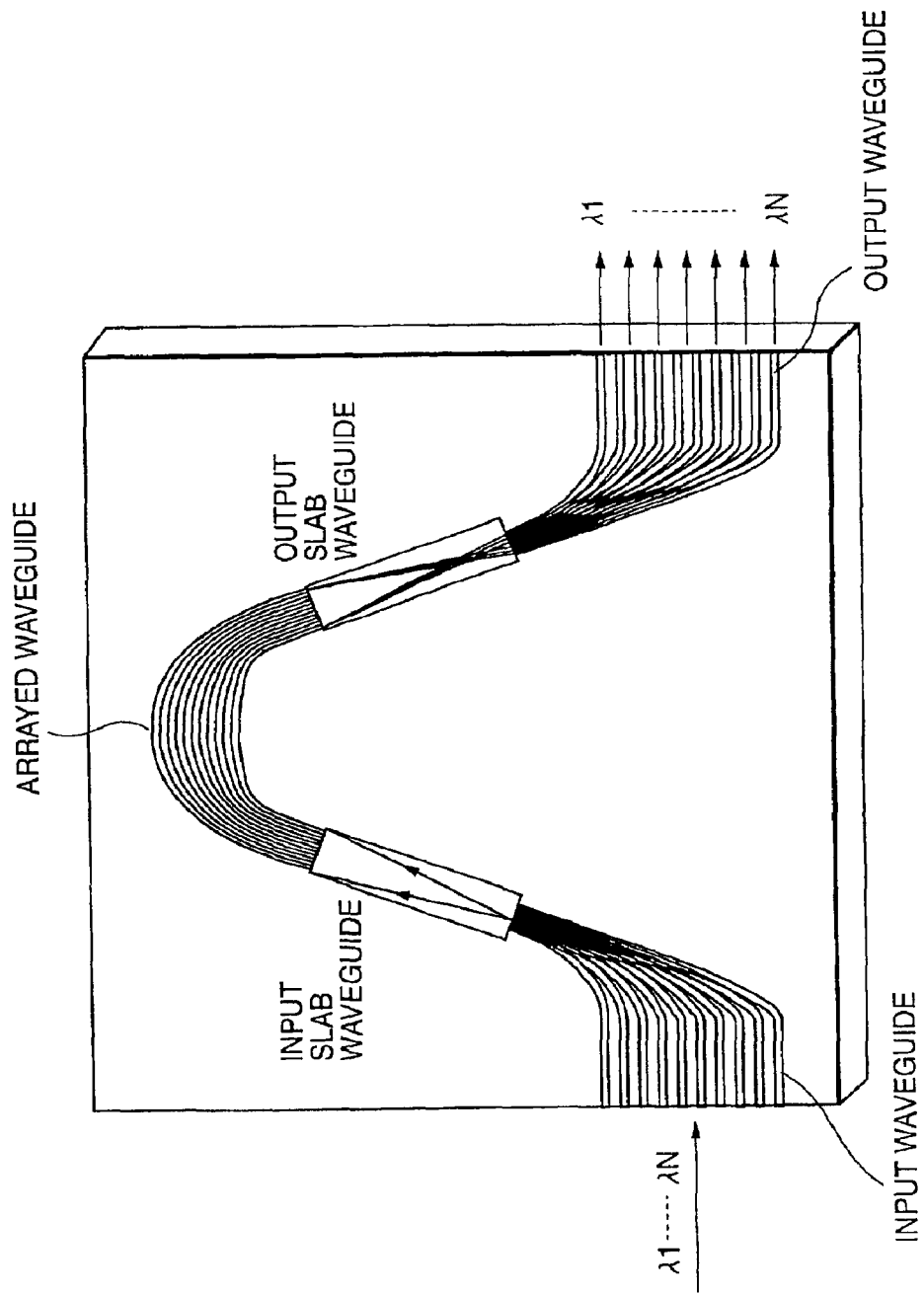
FIG. 1 is a diagram showing a configuration of an AWG device that is one of conventional multiplexer-demultiplexers.

As shown in FIG. 1, an arrayed waveguide grating (AWG) that is a conventional optical multiplexer-demultiplexer is configured by integrating input waveguides, input slab waveguides, arrayed waveguides, output slab waveguides and output waveguides through the use of a silica glass plane waveguide production technology on a silicon substrate. Its operating principles are similar to those of a spectroscope. The arrayed waveguide is comprised of a large number of channel waveguides, where differences in length of adjacent channel waveguides are set at several tens of $\mu m$ or so. This group of channel waveguides having optical length differences play a role of a diffraction grating in the ordinary spectroscope.

Signal light including a large number of wavelengths led to the input waveguide is radiated to the input slab waveguides and then distributed to arrayed waveguides. The distributed signal light is divided into a large number of the channel waveguides and radiated to the output slab waveguides and comes into a focus at a terminal of the output waveguides. When transmitted on the channel waveguides, however, it is delayed differently if wavelengths are different, and so it comes into a focus at a terminal of a different output waveguide depending on the wavelength, and is radiated out of the output waveguide. Thus, demultiplexer operation is performed. Inversely, due to reciprocity, if light of a large number of wavelengths is let the into input waveguides arranged in order of wavelengths, multiplexer operation is implemented because it is multiplexed on specific output waveguides and is outputted.

Figure 2:
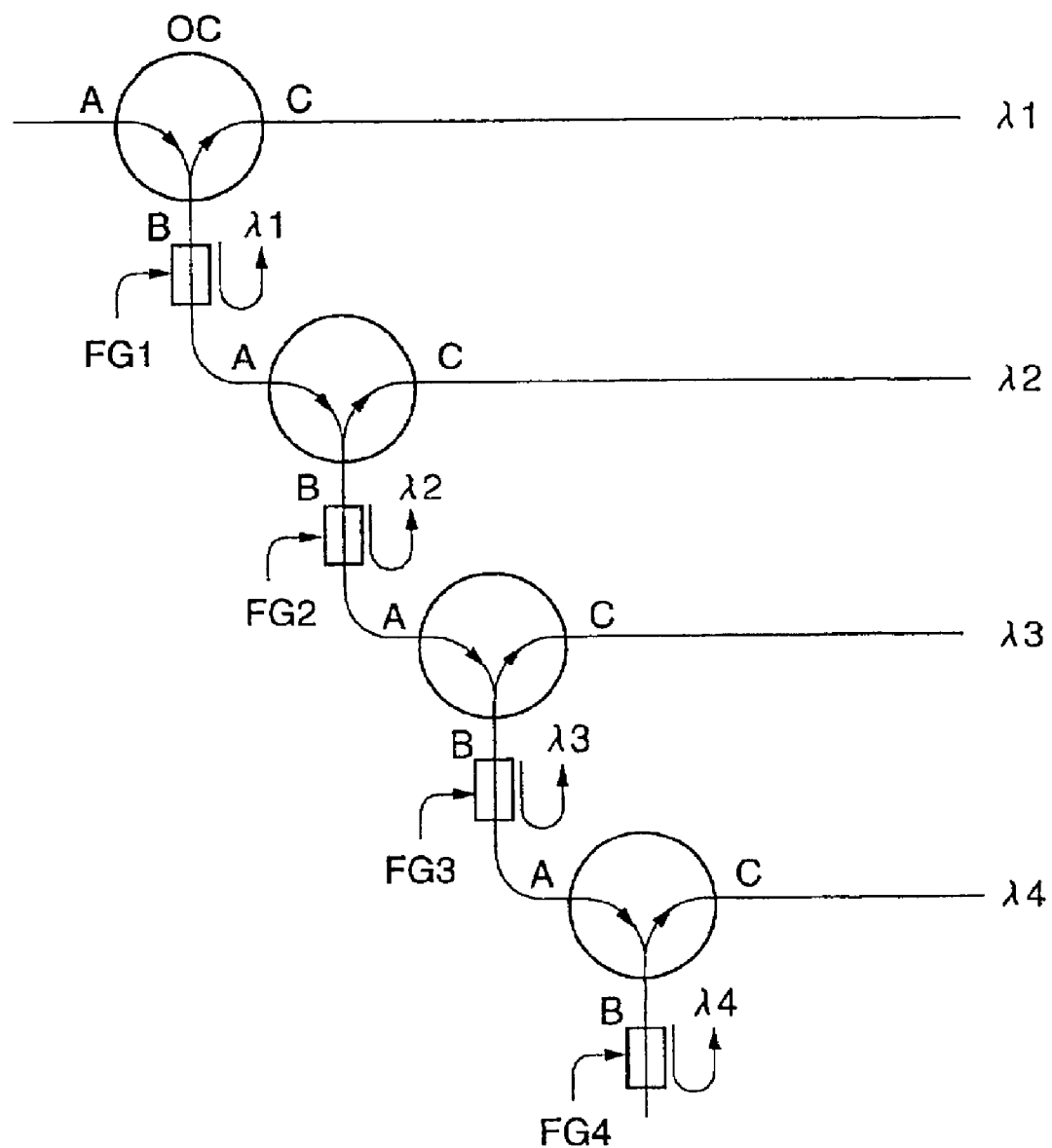
FIG. 2 is a diagram showing a configuration of the conventional multiplexer-demultiplexer comprised of a fiber grating and an optical circulator.

In addition, FIG. 2 is an example of a WDM device using a fiber grating that is a conventional and different optical multiplexer-demultiplexer. It is a demultiplexer configured by combining optical circulators (OC) of three terminals marked A, B and C with the fiber grating (FG) that reflects light of a specific wavelength. It can connect to a terminal B an FG for inputting the multiplexed light from a terminal A of the optical circulator and having light of a desired wavelength reflected and transmitting any other wavelength to a next tier so as to tap and output light of a specific wavelength reflected by the FG from a terminal C. It is also possible to configure a multiplexer by changing the connection method.

There are the following problems to the conventional optical multiplexer-demultiplexer. In the device in FIG. 1 using an AWG, a transmission wavelength property of the device deteriorates unless mutual phase relationship of the light transmitted on the large number of channel waveguides comprising the arrayed waveguides are always strictly kept. Nevertheless, at the time of producing the waveguides, there arises influence of fluctuations of a section size and a refractive index and also double refraction based on a distortion generated between it and a substrate. Thus, the phase relationship of the light transmitted on the channel waveguides collapses so that the transmission wavelength property of the device deteriorates and crosstalk is generated between the channels. For this reason, it is difficult to produce the device with high yields.

In addition, in the device in FIG. 2 using a fiber grating, a principle of having guided mode light of a specific wavelength reflected from a forward traveling wave to a backward traveling wave is used. This principle is also used for certain optical fiber sensors for detecting temperature and pressure in a highly sensitive manner, where a fault is that its reflection property is extremely sensitive to environmental variation such as temperature and pressure and besides, it is also a fault that the optical circulators to be used by a large quantity in order to configure the device are high-loss and high-cost.

Referring to FIG. 3, the multiplexer-demultiplexer of a first embodiment of the present invention comprises a principal optical fiber 1 and n pieces of branching fiber 2-1 to 2-n, and Bragg gratings 3-1 to 3-n formed tilting to an optical axis are provided in cores at n locations partway in the direction of optical transmission of the principal optical fiber 1, and also Bragg gratings 4-1 to 4-n formed tilting to the optical axis are provided in the cores near one terminal of the branching fibers 2-1 to 2-n. Periods of the n pieces of tilt gratings $\Lambda_1, \Lambda_2, \Lambda_3, \ldots \Lambda_n$ are all different.

And as shown in FIG. 4, the principal optical fiber 1 and the branching fibers 2-1 to 2-n are placed at areas forming the respective Bragg gratings in the optical axis direction with mutual optical axes parallel and the respective cores close. FIG. 4A shows a section view cut vertically to the optical axis and FIG. 4B shows a section view cut along the optical axis. As shown in FIG. 4A, a cladding 1b of the principal optical fiber is removed up to a boundary with the principal optical fiber core 1a, and a cladding 2-1b of the branching optical fiber is also removed up to a boundary with the branching optical fiber core 2-1a so that they are placed facing a removed side to each other with mutual optical axes parallel and the cores close.

And as shown in FIG. 4B, in physical relationship of the optical axis directions in which two fibers are closely placed, the areas forming tilt gratings respectively are located along the optical axis in an overlapping manner, and inclination θ of each individual tilt grating is in the plane made by a normal set up on the plane created by removing its portion including its cores and the optical axis of the optical fibers. A tilt grating 3-1 of the principal optical fiber 1 and a tilt grating 4-1 of the branching fiber 2-1 which are facing each other have the same period of grating and also the same tilt angle θ.

Operation of the first embodiment of the present invention will be described by referring to the section view of FIG. 4B that is cut along the optical axis and FIG. 3. In FIG. 4B, signal lights $\lambda_1$, $\lambda_2$, $\lambda_3$, . . . $\lambda_n$ that are wavelength-multiplexed n waves entering into the principal optical fiber core $1a$ from the left terminal of this principal optical fiber advance into the tilt grating 3-1, and then only the light of a wavelength $\lambda_1$ of the n waves is Bragg-diffracted by the tilt grating 3-1 of a period $\Lambda_1$, wave number $K_1$ ($=2n/\Lambda_1$) created in the principal optical fiber core. The Bragg condition is a condition wherein three vectors, that is, a wave number vector $k_{f1}$ of the incident light, a wave number vector $K_1$ of the tilt grating and a wave number vector $k_{a1}$ of the diffraction light diffracted to the air form a closed triangle. To be more specific, diffraction is made to a direction of an angle $\Phi_i$ satisfying both of the following expressions.

$$K_1 \cos(\theta_1) = k_{f1} + k_{a1} \cos(\Phi_1) \quad (1)$$

$$K_1 \sin(\theta_1) = k_{a1} \sin(\Phi_1) \quad (2);$$

Figure 5:
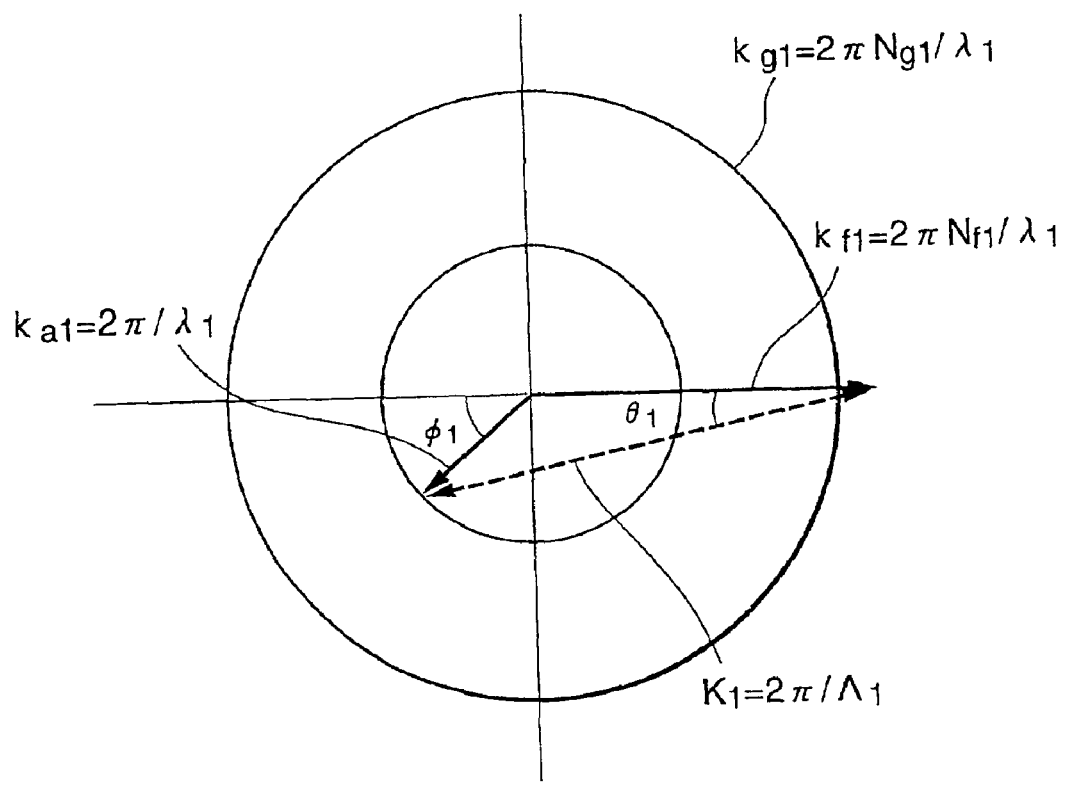
FIG. 5 is a drawing showing a wave number diagram for describing operation of the fiber-type optical coupler of the present invention.

FIG. 5 shows a relationship satisfying the above expressions (1) and (2). If the tilt grating is of sufficient length such as several tens of millimeters, then Bragg diffraction occurs, and light of a hundred-percent wavelength $\lambda_i$ mode on principles is diffracted in the air and any mode other than that wavelength propagates in the principal optical fiber core. In this connection, the tilt angle θ is 17 to 18 degrees or so at a wavelength of 1.55 μm.

Returning to FIG. 4B, the light of wavelength $\lambda_1$ diffracted by the tilt grating 3-1 enters into the tilt grating 4-1 existing sandwiching a slight gap, which is a branching optical fiber of the same structure as the principal optical fiber tilt grating 3-1. As the tilt gratings 3-1 and 4-1 are of the same structure, the Bragg conditions of the expressions (1) and (2) are also satisfied in the tilt grating 4-1 so that the incident light to the tilt grating 4-1 is diffracted by a hundred percent to be converted into the guided mode of the branching fiber 2-1. This configuration is similar to configuration wherein both tilt gratings are microwave transmission and reception antennas such as a horn reflector antenna and parabola antenna, and each individual core waveguide leading light to and having light led from the tilt gratings plays a role of each individual feeding waveguide and receiving waveguide.

The distance between the principal optical fiber core $1a$ and the branching optical fiber core $2$-$1a$ shown in the section view of FIG. 4A is long enough to the extent that a seepage of the guided mode transmitted in the core $1a$ into the air does not go as far as the core $2$-$1a$, that is, distant enough for both waveguides not to be optically coupled and yet for the light diffracted by the tilt grating 3-1 to enter almost entirely into the core $2$-$1a$ of the branching optical fiber 2-1 without widening, which value is approximately several μm.

In the embodiment of FIG. 3 wherein a plurality of couplers made up of pairs of such tilt gratings are formed, only the light of wavelength $\lambda_1$ out of the light that was wavelength-multiplexed and entered into the principal optical fiber 1 is branched into the branching optical fiber 2-1. Likewise, only the light of the wavelength $\lambda_2$ can be branched into the branching optical fiber 2-2, and furthermore, the light of the wavelength $\lambda_n$ can be branched into the branching optical fiber 2-$n$. To be more specific, a demultiplexer for isolating light of different wavelengths is configured.

In FIGS. 3 and 4B, the light of wavelength $\lambda_1$ incident from the left terminal of the principal optical fiber and advancing rightward is diffracted by a pair of tilt gratings 3-i, 4-i (i=1 to n) of configuration meeting the expressions (1) and (2), and the route for advancing rightward on the branching optical fiber 2-1 is reversible, so that in the inverse direction, that is, the light of wavelength $\lambda_1$ incident from the right terminal of the branching optical fiber 2-i is diffracted by a pair of tilt gratings 4-i, 3-i to be coupled with guided light of the principal optical fiber 1 advancing leftward. To be more specific, the embodiment in FIG. 3 also has a function of the multiplexer.

The multiplexer-demultiplexer of the present invention has almost no dependency on polarization. To be more specific, as shown in FIG. 4A, because the core $1a$ or $2$-$1a$ exposes a surface partially in the air and is mostly surrounded by claddings, its non-axis symmetry property of boundary conditions against a waveguide layer is extremely small. Thus, the dependency on polarization by the Bragg grating is little, and so a diffraction property of almost no dependency on polarization can be acquired. As this configuration has its grating formed in a slanting direction to the optical axis so that reflection and transmission property of a plane wave has dependency on polarization to dielectric multiplayer, in the case where a difference in the Bragg condition (phase matching condition) arises between the core guided mode that polarizes in parallel to the plane made by the optical axis and a grating wave number vector K and the core guided mode that polarizes vertically resulting in a difference in optical transfer properties, it is possible to secure no dependency on polarization by providing two tilt gratings having slightly different tilt angles and periods along the optical axis of the core.

Next, a method of production and assembly of the above described first embodiment will be described by referring to the drawings. FIGS. 6A and 6B are diagrams showing how to produce a fiber tilt grating, where FIG. 6A is a front view, and FIG. 6B is a perspective drawing viewing only a grating creation mask and an optical fiber in a plane manner. Ultraviolet light 17 oscillated by a KrF excimer laser 10 is applied to a fiber grating creation phase mask 12. The phase mask uses a nitrated material of high permeability to ultraviolet light of fused quartz and so on, and has an uneven grating of which section is a rectangle. A level difference between concave and convex portions is formed so that a phase difference becomes an integral multiple of a ½ wavelength to the wavelength of the ultraviolet light 17 and width becomes 1:1 between the concave and convex portions. The light incident in the phase mask 12 of which phase difference is a ½ wavelength and ratio between the concave and convex portions is 1:1 is diffracted by the phase mask so as to be emitted only as +primary diffraction light 13 and—primary diffraction light 14. They interfere to form interference fringes 15. Where the interference fringes 15 were formed, to make the refractive index of the core section higher than that of the cladding section, an ordinary silica communication single mode optical fiber 11 that is doping Ge is placed in the core section. As for placement relationship of the phase mask 12 against the optical fiber 11, the phase mask 12 is rotated and placed so that the interference fringes 15 are inclined against the optical axis of the optical fiber 11 just by the angle θ on plane placement as shown in FIG. 6B. As with conventional FBG creation, ultraviolet light is irradiated to the optical fiber 11 so as to form a grating arising from generation of a color center of Ge in the core section. And then, the phase mask is replaced with one having a different grating pitch, and one optical fiber is moved to another location by sliding or a fiber rod cut short in advance is replaced so as to form tilt gratings of different Bragg diffraction wavelengths one after another.

Next, a method of forming a plane contacting the core surface on the optical fiber that has thus formed a tilt-shaped fiber grating will be described. As aforementioned, this surface is parallel with the optical axis of the optical fiber and also vertical to the plane including the optical axis and the tilt angle of the tilt grating.

FIG. 7 shows a structure of an optical fiber supporting member using a silicon wafer forming V grooves and fiber arrangement to it. This plays a role of both a "spline" and an "assembly jig" for forming a plane contacting the core surface. FIG. 7A is a plan view, B is a front view, and C shows a section view at a cutting line A-B.

On the substrate of Si wafer 20, a plurality of V grooves 21 and 22 are formed in parallel each other. The V grooves 21 is a groove supporting the optical fiber forming the tilt grating, and the V grooves 22 is a groove supporting a dummy fiber 40. The dummy fiber 40 forms a plane reaching the core surface on the optical fiber forming the tilt grating, and in a later process of assembling two sets of optical fiber lines formed in section shape that may be called D-shape by joining the above planes as shown in FIG. 4A, it plays a role of a guide, so to speak, to secure precision of parallelism and proximity between the upper and lower cores.

Optical fibers 30 forming the tilt grating are placed in line in the V groove 21. The optical fibers 30-1, 30-2 and 30-3 are forming the tilt gratings of different Bragg wavelengths, and the placement relationship between the tilt direction of the gratings and the Si wafer principal plane is that, as shown in FIG. 7C, the plane including the optical axis and the tilt angle direction is placed to be orthogonal to the Si wafer principal plane. The optical fibers 30 can be placed on the V groove 21 by folding one fiber forming a plurality of the tilt gratings in the axial as one piece, or those cut short in advance can be separately placed.

Such a jig is used to polish the optical fibers 30, that is, to polish the plane by using a mechanochemical method (MC polishing) of concurrently using chemical etching and mechanical polishing until the core surface is just exposed. At this time, it is also possible to form film 50 that plays a role of a polishing stopper to the MC polishing and set in advance a width dimension W1 of the V groove on which the optical fibers 30 are to be placed so that, when the polishing plate reaches the polishing stopper and the polishing is stopped, the polishing has spontaneously reached the core surfaces of the optical fibers 30.

It is also possible to make the shape of the V groove for accommodating the optical fibers as shown in FIG. 8. To be more specific, just as shown in the plan view in FIG. 6A, it is possible to form the width of the V groove supporting the optical fiber narrowly at the center of the substrate Si and form it widely ahead of and behind the center so as to mount the optical fiber as arched on the whole by making it high at the center and deep down in the substrate Si ahead of and behind the center as shown in FIG. 8B, thereby allowing to polish only the area requiring polishing.

In addition, it is further desirable after this plane polishing to perform antireflection coating by a single-layer or multilayer dielectric film in order to eliminate Fresnel reflection on the polished surface, between the quartz that is a matrix of the optical fiber and the air.

Next, an assembling method will be described, where a principal optical fiber and a branching optical fiber having tilt gratings and exposing the core are approximated to be assembled into the optical multiplexer-demultiplexer in FIG. 3. FIG. 9 shows an example of a multiplexer-demultiplexer comprised of two fibber arrays 60-1 and 60-2 forming three tilt gratings of different Bragg wavelengths and having completed the above polishing. FIG. 7A shows a completed multiplexer-demultiplexer for three waves, and FIG. 7B shows a section view at the cutting line A-A.'

A D-shaped fiber array made by 31-1, 31-2 and 31-3 forming tilt gratings and a D-shaped fiber array made by 32-1, 32-2 and 32-3 are facing each other. While the Bragg wavelengths are different among the respective sets, the fibers facing each other have tilt gratings of the same Bragg wavelengths formed. In order to secure the parallelism of the optical axes of both cores, horizontal relative physical relationship between the formed tilt gratings and an adequate gap between fiber arrays 60-1 and 60-2, a dummy fiber 40 for guide is inserted into the V groove provided at both ends of the arrays so as to fix the two fiber arrays 60-1and 60-2 as one piece by organic adhesion or metallic fusion.

After that, in the case where the tilt grating fibers placed on the V groove for the purpose of polishing for forming the aforementioned plane are linked as one, the optical fiber of the fiber array 60-2 on the branching side in FIG. 7A is cut to expose its end face. In addition, if the tilt grating fibers placed on the V groove are cut one by one, a splice for linking principal optical fibers of the fiber array 60-1 into one piece is conducted. The above process completes the optical multiplexer-demultiplexer of the first embodiment of the present invention.

Moreover, as the gap made between the upper and lower fibers just has to be of a lower refractive index than the fiber cladding, it is also feasible to fill it with the air as it is or a transparent low molecular or high molecular resin of lower refractive index than quartz such as a fluorine-inclusive resin.

Furthermore, in the case where variances arise as to production precision of the V groove provided for inserting the dummy fiber 40 for guide or a diameter of the dummy fiber 40 itself so that the distance between the planes of fiber arrays 60-1 and 60-2 may not be set correctly, it is also possible, when assembling a liquid crystal panel, to disperse spacers to be inserted between two sheets of glass to be cemented together in the areas other than the cores.

As mentioned above, the optical coupler configuration between the optical fibers by the tilt gratings of the present invention uses silica communication single mode optical fibers as its matrix, which is produced by strictly controlling optical propagation properties, and so it can be manufactured with stable yields without varying Bragg matching condition depending on a lot of the optical fibers to be used.

Next, a fiber optical amplifier of a second embodiment of the present invention will be described by referring to the drawings. FIG.10 is an embodiment wherein the present invention is implemented to a fiber optical direct amplifier, and it comprises an optical amplification rare-earth dope fiber 70 containing rare-earth elements, an excitation laser diode 74, an excitation light coupling tilt Bragg grating 71-1 provided to an input fiber on a light signal input side of the rare-earth dope fiber 70, a tilt Bragg grating 71-2 provided to an excitation light output fiber forming a pair therewith, a signal light output tilt Bragg grating 72-1 provided on an output side of the rare-earth dope fiber 70 and a tilt Bragg grating 72-2 provided to a signal extraction fiber forming a pair therewith.

Configuration of a pair of the fiber tilt Bragg gratings is the same as the configuration in FIG. 4, and it is produced and assembled by the method described in detail so far.

The tilt Bragg grating 71-1 and 71-2 that form a pair couple excitation light 74 having a different wavelength from signal light 73 to the rare-earth dope fiber 70. As the signal light 73 does not satisfy the Bragg wavelength, it enters into the rare-earth dope fiber 70 by transmitting through the grating without getting diffracted by it. For instance, in the case where erbium is used as a rare-earth element, light of around 1.55~$\mu$m wavelength is often used as signal light, and light of 1.49 $\mu$m or 0.98 $\mu$m is often used as excitation light. The tilt gratings 72-1 and 72-2 that form a pair on the output side of the rare-earth dope fiber 70 output light of signal light wavelength 75 after performing Bragg diffraction and eliminates amplified spontaneous emission (ASE) 76 that becomes noise light from the optical amplifier. Thus, the multiplexing and demultiplexing properties of the optical coupler created by the pair of tilt gratings of the configuration of the present invention are effectively utilized. To be more specific, a remarkably matching optical circuit comprised only of optical fiber configuration requiring no optical coupling parts such as a lens for multiplexing and demultiplexing can be configured.

While the embodiment of FIG. 10 describes a case of a forward excitation wherein optical excitation occurs ahead of the rare-earth dope fiber, it is also effective in the case of backward excitation and excitation occurring both forward and backward.

Next, a further embodiment of the present invention will be described. Before that, further unique properties of basic components of the present invention will be described. This description will help understand the third embodiment and thereafter that utilize the unique properties.

The basic components of the present invention are, so to speak, a set of Bragg diffraction optical couplers of configuration wherein two optical fibers forming a tilted Bragg grating in the core section are placed with their optical axes parallel and the respective cores close in the area forming mutual tilt gratings. In the placement related to a propagation direction of guided mode light and a tilt angle of the Bragg grating described in detail so far, this device causes Bragg diffraction coupling from the guided mode for letting it in from the left terminal of one primary optical fiber and advancing it rightward in the core section to the guided mode for also advancing it rightward in the other second optical fiber core via the tilt Bragg grating, and then emits it from the right terminal of the secondary primary optical fiber. As reciprocity holds as to the propagation during this process, and so if light is let in from the other secondary right terminal, it is emitted from the left terminal of the primary optical fiber.

In case of thinking of the tilt angle of the above Bragg grating as fixed, however, the guided mode light incident from the right terminal of the primary optical fiber and advancing leftward is not diffracted by the grating since there is no radiation mode allowing a Bragg matching condition to hold and only advances leftward to transmit and propagate in the core of its own primary optical fiber. In addition, the mode light incident from the left terminal of the other secondary optical fiber and advancing rightward is not diffracted by a grating also because no Bragg matching condition holds and only advances rightward to transmit and propagate in the core of its own secondary optical fiber. To be more specific, it is characterized by showing a different transmission property depending on the terminal from which it enters the optical fiber core.

Unique operation of the Bragg diffraction coupling elements between the above tilt Bragg gratings will be described by referring to FIGS. 11 and 12. As shown in FIG. 11A, when the guided mode $k_f$ entering into the principal optical fiber side from the left terminal and advancing rightward advances into the tilt grating, the guided mode $k_f$ undergoes Bragg diffraction by the tilt grating and couples with the radiation mode $k_a$ on the air side. Inversely, if light of wave number $k_a$ enters into the tilt grating at a Bragg angle from the air side, it is converted into the guided mode $k_f$ advancing leftward in the principal optical fiber. This is the reciprocal operation described in the first embodiment shown in FIG. 3. FIG. 11B is a diagram describing phase matching conditions in a wave number space.

As opposed to this, FIG. 11A' shows that, when the guided mode $k_f$ entering into the principal optical fiber shown by the wave line from the right terminal and advancing leftward advances into the tilt grating, radiation light $k_a$ to the air side is not generated and it propagates and transmits as the guided mode $k_f$ without being diffracted by the grating. It can be understood from the phase matching condition in the wave number space of FIG. 11B. If the wave vector of the guided mode indicated by the wave line currently transmitting leftward in the wave number space enters into the grating, it cannot pump radiation light of the size of the wave number in the air in the solid line via a wave vector K of the tilt grating in the double line. It is because a cladding section of a higher refractive index than the air exists above the grating but there is no air, since light $k_g$ ($>k_a$) of the wave number propagating in the cladding section cannot be pumped by the grating.

Likewise, in FIG. 12, FIG. 12A shows the reciprocal operation described in the description of operation of the first embodiment wherein, when the light of Bragg wavelength wave number $k_a$ enters into the tilt Bragg grating on the branching optical fiber side of FIG. 3 at the Bragg angle from the air side, it undergoes Bragg diffraction by the tilt grating, couples with the guided mode $k_f$ of the branching optical fiber, and if the guided mode $k_f$ inversely enters into the tilt grating from the right side, it is converted into radiation light to the air $k_a$, and FIG. 10B is a diagram describing the phase matching in the wave number space.

As opposed to this, FIG. 12A' shows that, when the guided mode $k_f$ enters from the left terminal of the branching optical fiber shown by the wave line, radiation light to the air side is not generated and it transmits and propagates as-is as the guided mode $k_f$ without being diffracted by the grating. This phenomenon can be understood from the phase matching condition in the wave number space of FIG. 12B'. If the wave vector of the guided mode $k_f$ indicated by the wave line currently transmitting rightward in the wave number space enters into the grating, it cannot pump radiation light of the size of the wave number $k_a$ in the air in the solid line via the wave vector of the tilt grating in the double line. It is because a cladding section of a higher refractive index than the air exists below the grating but there is no air. That is because the light of the wave number $k_a$ propagating in the cladding section does not meet the phase matching condition and so it cannot be pumped by the grating K.

Figure 13A:
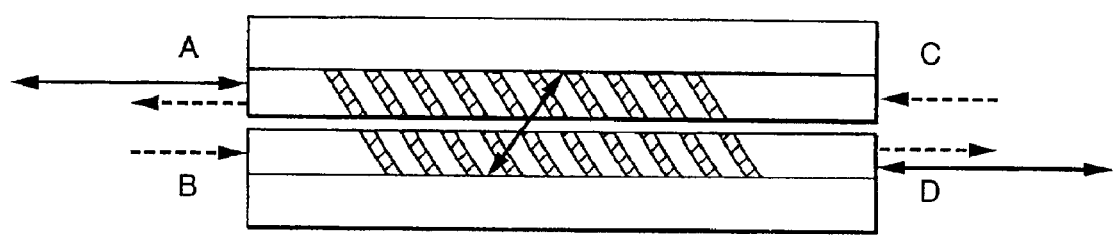
FIGS. 13A and 13B are diagrams for describing operating principles of the optical irreversible transmission property of the fiber-type optical coupler of the present invention.
Figure 13B:
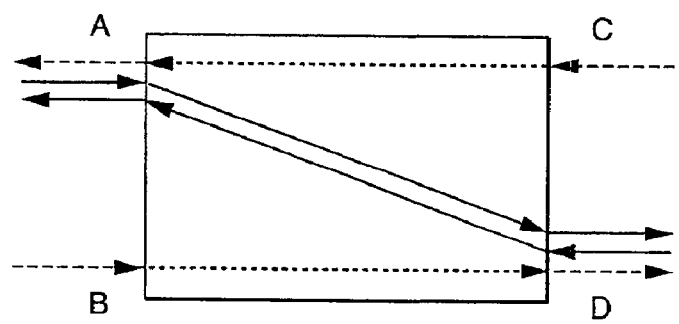

Thus, if a set of Bragg diffraction-shaped light couplers of configuration wherein two optical fibers having tilted Bragg gratings formed in their core sections are placed with their optical axes parallel and the respective cores close in the areas forming mutual tilt gratings, as shown in FIG. 13A, the guided mode entering into the upper core shown by the solid line from a left terminal A is diffracted by the Bragg grating, couples with the guided mode of the lower core and advances rightward to be outputted from a right terminal D. And as both arrows in the solid line indicate, this optical path is reversible. As opposed to this, as shown by the dashed lines, the light incident from a right terminal C on the opposite side to the solid line of the upper core is not diffracted by the Bragg grating, and transmits and propagates in its core as the guided mode to be outputted from the left terminal A. Likewise, the light entering into the lower optical fiber from a left terminal B transmits through its core in a straight line and is emitted from the right terminal D. The circuit in FIG. 13B is the optical circuit of FIG. 13A represented as a four-terminal. Thus, the optical coupler of the present invention shows an irreversible transfer property.

It is possible to implement a useful directional device by utilizing the above irreversible optical transmission property of the optical coupler of the present invention.

FIG. 14 shows the multiplexer-demultiplexer using two waves of a third embodiment of the present invention. FIG. 12A shows a configuration principle diagram, and FIG. 12B shows an assembly diagram.

In FIG. 12A, a principal optical fiber 100 is coupled with a branching optical fiber 102-1 for receiving the wavelength $\lambda_1$ by a Bragg diffraction optical coupler 106-1 by the tilt grating, and is also coupled with a branching optical fiber 102-2 for receiving the wavelength $\lambda_2$ by a Bragg diffraction optical coupler 106-2. In addition, a branching optical fiber 103-1 for sending the wavelength $\lambda_1$ is coupled with the principal optical fiber 100 by a Bragg diffraction optical coupler 107-1 having the same properties as that for receiving the wavelengths $\lambda_1$. Moreover, a branching optical fiber 103-2 for sending the wavelength $\lambda_2$ is coupled with the principal optical fiber 100 by a Bragg diffraction coupler 107-2 having the same properties as that for receiving the wavelength $\lambda_2$.

If the light with the wavelengths $\lambda_1$ and $\lambda_2$ multiplexed incident from an optical input-output terminal at the left terminal of the principal optical fiber 100 enters into the Bragg diffraction optical coupler 106-1, only the wavelength $\lambda_1$ is led by the branching optical fiber 102-1 and undergoes photoelectric conversion at a light receiving device 104-1 according to the principle described in detail so far. The light in the principal optical fiber 100 that became only the wavelength $\lambda_2$ by demultiplexing the light of the wavelength $\lambda_1$ is demultiplexed by the Bragg diffraction coupler 106-2 in which the Bragg wavelength formed by the principal optical fiber 100 and the branching optical fiber 102-2 is tuned to $\lambda_2$, and is received by the receiving device 104-2.

On the other hand, the Bragg diffraction optical coupler 107-1 provided to the principal optical fiber for multiplexing of which Bragg wavelength is tuned to $\lambda_1$ and the Bragg diffraction optical coupler 107-2 of which Bragg wavelength is tuned to $\lambda_2$ couple the respective output of a semiconductor laser 105-1 oscillating at the wavelength $\lambda_1$ and a semiconductor laser 105-2 oscillating at the wavelength $\lambda_2$ with the principal optical fiber 100 as a guided mode advancing leftward. Even if the light of the wavelength $\lambda_1$ coupled with the principal optical fiber 100 reaches the aforementioned branching Bragg diffraction optical coupler 106-1 tuned to this wavelength, it is not coupled with the branching optical fiber for receiving 102-1 due to the above-mentioned nonreciprocity and advances in the principal optical fiber 100. Likewise, even if the light of the wavelength $\lambda_2$ coupled with the principal optical fiber 100 reaches the aforementioned branching Bragg diffraction optical coupler 106-2 tuned to this wavelength, it is not coupled with branching optical fiber for receiving 102-2 due to the above-mentioned nonreciprocity and advances in the principal optical fiber 100 in a state of being multiplexed with the light of the wavelength $\lambda_1$.

Figure 9A:
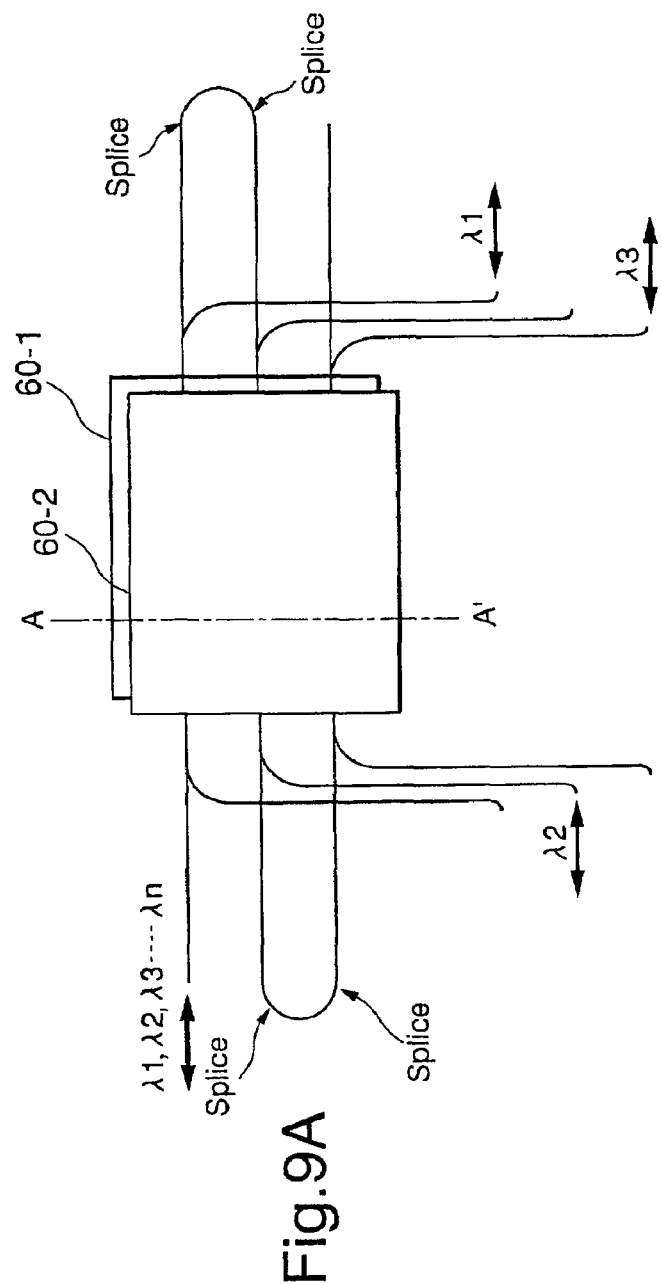
FIGS. 9A and 9B are diagrams showing a structure of a module of the multiplexer-demultiplexer using the fiber-type optical coupler of the present invention after assembly and implementation.
Figure 9B:
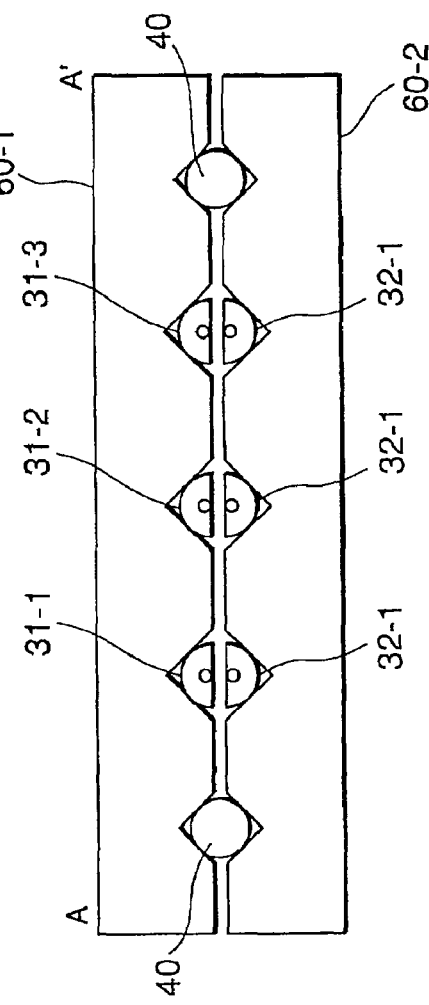

This multiplexer-demultiplexer can be completed by the methods of production and assembly shown in the first embodiment, as with the demultiplexer shown in FIG. 9A, by combining two V grooves supporting the fiber with supporting plates 110-1 and 110-2 and splicing the optical fiber as required as shown in FIG. 14B.

As the multiplexer-demultiplexer of this embodiment can be produced at low cost, it is quite effective if used as an optical component comprising a terminating unit of the aforementioned access network and CATV network. Conventionally, plane-type silica and plastic waveguide devices have been studied as optical multiplexing-demultiplexing parts for 2-wavelength two-way transmission (optical transceiver) of the light of 1.3 $\mu$m and 1.55 $\mu$m, and yet, it has been difficult to perform successful communication since transmission light directed to an up link of high intensity diffracts to the receiving device for a down receiving link and receiving signals are masked. As for the multiplexing-demultiplexing device of this embodiment, the above problem of crosstalk does not occur since a transmission LD and the receiving device are easily separable optically.

While the third embodiment was described based on two waves, it is easy to extend it to an optical multiplexer-demultiplexer for a super high-density wavelength multiplexing transmission system for wavelength-multiplexing several tens or several hundreds of waves into one optical fiber and transmitting. In addition, it can be applied not only to a communication system of a basic network but also widely to an optical add drop multiplexing (Optical ADM) system for putting signals in and out by wavelengths on a node on the way, an optical cross-connect (Optical XC) system for recombining wavelength paths and besides, an optical routing system of new network configuration for using wavelengths as address information to determine a destination of optical signals.

Inversely, a useful device can also be acquired in the case of one wave. FIG. 15 shows configuration of a transmitter/receiver of one wave using the same wavelength for transmission and reception according to the fourth embodiment of the present invention. It is configured by a Bragg diffraction optical coupler 90 connected to a communication line 95, a photoreceiver 94 for receiving a down signal $\lambda$down91 and an LD93 for receiving an up signal $\lambda$up92. The down signal $\lambda$down91 and the upsignal $\lambda$up92 have almost the same wavelength. As described as the nonreciprocal optical transfer property of this Bragg diffraction optical coupler in FIG. 13, the down signal $\lambda$down91 is optically transferred between the fibers by Bragg diffraction in this Bragg diffraction optical coupler 90 and is led to the photoreceiver 94 for receiving, whereas the up signal $\lambda$up emitted from the LD93 transmits through the Bragg diffraction optical coupler 90 in a straight line and is coupled with the communication line 95. Thus, this Bragg diffraction optical coupler allows two-way communication by using the same optical fiber transmission line, and what is more, by one wave.

Moreover, from another viewpoint, if FIG. 15 is regarded merely as a one-way communication transmitter of $\lambda$up rather than two-way communication and λdown as reflected returning light from the LD93 transmission line, the reflected returning light is inhibited from entering into the LD, and therefore it can also be said that the Bragg diffraction fiber optical coupler 90 itself plays a role of an isolator.

Next, it is further possible, by utilizing the nonreciprocity of the Bragg diffraction optical coupler by the tilt grating of the present invention, to couple a plurality of light of the same wavelength to one optical fiber with no loss so as to implement an optical multiplexer with no loss.

As a fifth embodiment, FIG. 16 shows a configuration of the optical multiplexer with no loss. FIG. 16 indicates the optical multiplexer with no dependency on polarization and no loss wherein output of n pieces of LD301 of wavelength $\lambda_1$ and output P watts is coupled with one principal optical fiber 300 via Bragg diffraction optical couplers 302 of which Bragg wavelengths are tuned to $\lambda_1$ respectively to create light of intensity nP watts, which effectively uses the nonreciprocal optical transmission property of the Bragg diffraction optical coupler of the present invention.

In the optical access system of which representative example is a PDS (Passive Double Star) network system that performs two-way optical communication between a station and N (a plurality) subscribers via 1:N optical star couplers, the star coupler sufficiently functions in a descending distribution system but ascending signals from the subscriber lines can only collect power of 1/N at the station in the ascending multiplexing system, which poses a problem that up signal transmission loss is great. The optical multiplexer of this embodiment is effective as a method of implementing an N:1 optical multiplexer with no loss and capable of solving such a problem.

Next, an example of configuring an optical circulator is shown as a sixth embodiment of the present invention. Here, an example of three ports is described. As for operation of a three-terminal circulator in principle, as shown in FIG. 2, it operates so that a signal inputted to the terminal A is outputted to the terminal B, an input signal to the terminal B is outputted to the terminal C, and an input signal to the terminal C is outputted to the terminal A.

If an optical circulator performing the same operation as this is implemented by utilizing the nonreciprocity of the Bragg diffraction optical coupler by the tilt grating of the present invention, it can be configured as shown in FIG. 17 as an example. 201, 202 and 203 in the drawing are Bragg diffraction optical couplers supported by two V-groove substrates on the topside and underside, where the left terminal of the upper optical fiber 204 of the Bragg diffraction optical coupler 201 is the input terminal A, the left terminal of the upper optical fiber 205 of the Bragg diffraction optical coupler 202 is the input terminal B, and the left terminal of the upper optical fiber 206 of the Bragg diffraction optical coupler 203 is the input terminal C. And it is a circuit connecting the right terminal of the lower optical fiber 207 of the Bragg diffraction optical coupler 201 to the right terminal of the upper optical fiber 205 of the Bragg diffraction optical coupler 202, the right terminal of the lower optical fiber 208 of the Bragg diffraction optical coupler 202 to the right terminal of the upper optical fiber 206 of the Bragg diffraction optical coupler 203, and the right terminal of the upper optical fiber 204 of the Bragg diffraction optical coupler 201 to the right terminal of the lower optical fiber 209 of the Bragg diffraction optical coupler 203.

Next, its operation will be described. Light 210 inputted to the terminal A enters into the Bragg diffraction optical coupler 201, and then it transmits to the lower optical fiber 207 of the Bragg diffraction optical coupler 201 due to this optical coupler's action. As the lower optical fiber 207 of the Bragg diffraction optical coupler 201 is connected to the upper optical fiber 205 of the Bragg diffraction optical coupler 202, this light 210 is inputted to the Bragg diffraction optical coupler 202 through the optical fiber 205. As the advancing direction of this light 210 to the Bragg diffraction optical coupler 202 is a direction not causing diffraction as aforementioned, the light advances as-is to the upper optical fiber 205 to be outputted to the terminal B.

Next, light 211 inputted to the terminal B is outputted to the terminal C on the same route as the one experienced by the aforementioned light inputted to the terminal A. Likewise, light 212 inputted to the terminal C is outputted to the terminal A, and three-port optical circulator operation is implemented as a whole.

As such a Bragg diffraction optical coupler of the present invention has another unique characteristic of being able to perform optical wiring among the devices three-dimensionally, configuration can be easily performed by using this characteristic. While the above example shows an instance of a three-port optical circulator, it is possible to configure an optical circulator of four ports or more terminals and also to create a multiple-port model in advance and change the number of ports afterward by changing optical fiber connections.

Figure 18:
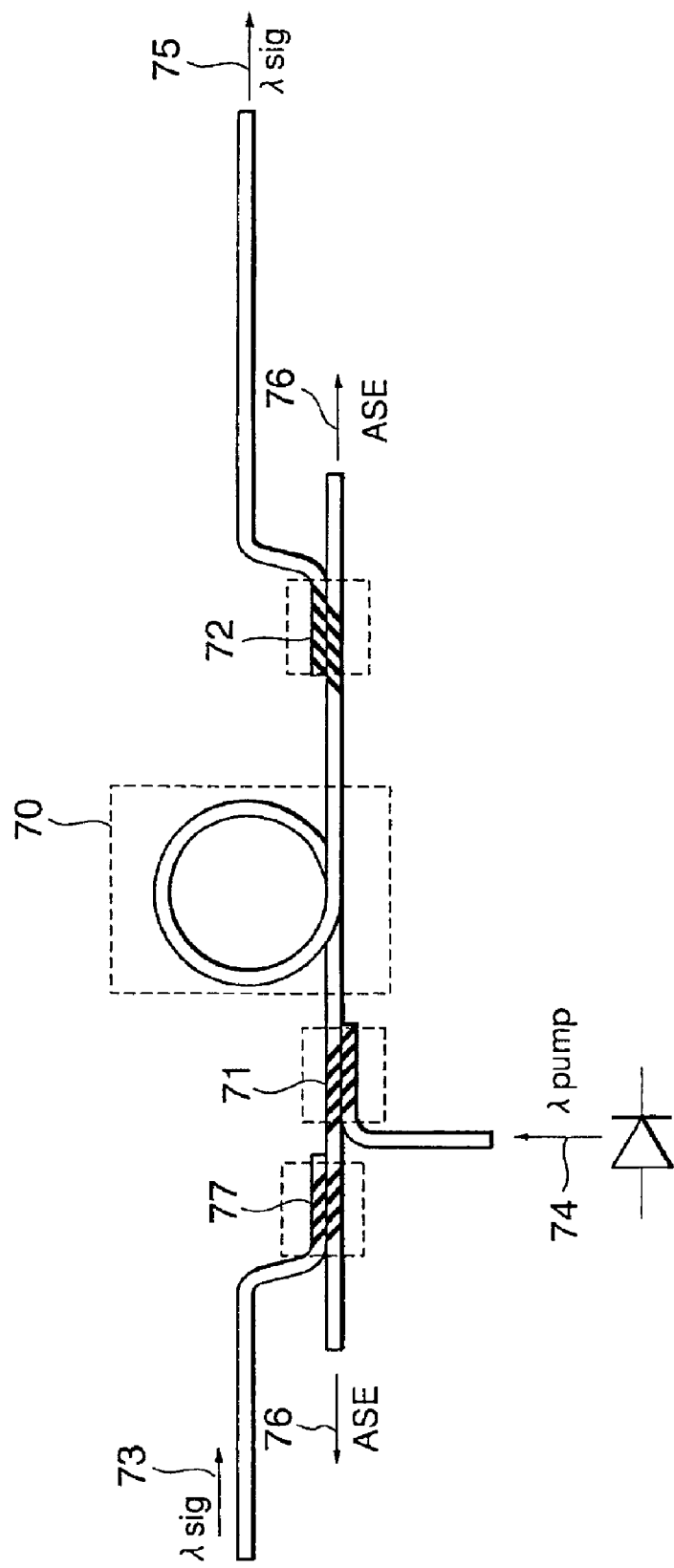
FIG. 18 is a block diagram of the optical fiber amplifier using the optical irreversible transmission property of the fiber-type optical coupler, which is a seventh embodiment of the present invention.

Next, a seventh embodiment of the present invention will be described by using FIG. 18. If the fiber optical amplifier of the second embodiment of the present invention is reviewed from a viewpoint of the nonreciprocity of the Bragg diffraction optical coupler, it is understood that a Bragg diffraction optical coupler 72 on the output side of a fiber optical amplifier 70 not only has a function of filtering signal light 75 from spontaneous emission light 76 of the fiber optical amplifier 70 but also plays a role of the optical isolator for preventing reflected light from connection points such as a connector of output signal light 75, backward scattering light of the wavelengths of signal light itself from the transmission line optical fiber due to signal light of high intensity and backward scattering light of different wavelengths due to optical nonlinear effects of the optical fiber from returning to the optical amplifier 70 and being amplified on the input side of the optical amplifier to flow backward. Therefore, if a Bragg diffraction optical coupler 77 is newly provided on the input side of the optical amplifier 70 in addition to it, it is possible to avoid bad influence on the signal transmission side and the repeater on the front tier exerted by the spontaneous emission light 76 also released on the input side of the optical amplifier 70 going back on a signal input fiber to the fiber optical amplifier.

While the description of the tilt grating has referred to a case of a simple grating so far for the purpose of simplification, various methods of adjusting the transmission wavelength property can be used in the Bragg diffraction optical coupler by the tilt grating of the present invention for various filters including electricity and not limited to light. For instance, a chirped grating can be used instead of a single period grating in order to expand a transmission wavelength width. In addition, the present invention can also adopt assignment of weights by superimposing various window functions such as a Gaussian window in order to suppress side lobes appearing before and after wavelengths of a central transmission area. There are two methods thereof, that is, a method of assigning weights to grating amplitude of the tilt grating in the direction of optical transmission, and a method of controlling an access distance of the two optical fibers comprising the optical coupler in the direction of optical transmission or purposely causing the optical axes to slightly intersect. Weights can be assigned to grating amplitude when forming the grating by ultraviolet exposure. In addition, it is possible to assign weights by the access distance of the two optical fibers, when polishing the plane reaching the core surface, by controlling the V groove width supporting the optical fiber shown in FIG. 6 in the direction of the fiber length, for instance, thus controlling curvature of bending support of the fiber. Moreover, it is possible to cause the optical axes to slightly interset by making an angle on the V groove to be formed with the upper and lower supporting substrates of the optical fiber in advance.

Moreover, in the description of the production and assembly method of the fiber Bragg diffraction optical coupler by the tilt grating, while it was mentioned that the V groove substrate supporting the optical fiber should use a Si wafer, the substrate is not limited to it, and it can be a glass substrate, a ceramic such as alumina with the V groove made in advance and sintered, or a metal with the V groove made by cutting work. It is because, as assembly of this device only requires that the supporting substrates to be overlaid have the V grooves of the same arrangement rather than such accuracy of the distances between the V grooves as required by connection between an array fiber and a waveguide array, the above condition is satisfied, even in the case of a cut metal substrate of which high accuracy of the row of V grooves cannot be expected, by dividing the cut substrate into two for use.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. An optical component using a fiber-type optical coupler comprising:

first and second optical fibers for coupling light from one optical fiber to another, wherein said first and second optical fibers each have a core on which a slanting Bragg diffraction grating is formed, and a cladding of different refractive indexes, wherein said first and second optical fibers border a plane parallel with an optical axis of each said core, each said core being exposed to an air gap at said plane, wherein light diffracted from the Bragg diffraction grating of the core of said first optical fiber is coupled to the core of the Bragg diffraction grating of said second optical fiber, and wherein a plurality of said second optical fibers for coupling different wavelengths are connected to the first optical fiber so that slanting directions of respective ones of said Bragg diffraction grating become the same as the direction of optical transmission in said plurality of second optical fibers.

2. The optical coupler according to claim 1, wherein a wave vector of said slanting Bragg diffraction grating is located in a plane normal to the plane parallel with an optical axis of each said core, almost contacting said core and said optical axis, and an angle θ made by said wave vector and said optical axis is 0 degree <θ<90 degrees.

3. The optical coupler according to claim 1, wherein said first and second optical fibers are placed approximately contacting said plane parallel with an optical axis of each said core, so that respective optical axes are almost parallel and so that slanting directions of said respective Bragg diffraction gratings are almost parallel.

4. The optical coupler according to claim 1, wherein refractive indexes of the two claddings bordered with the plane parallel with an optical axis of each said core are such that the refractive index of the cladding included in the area where the core exists is higher than that of the cladding included in the area where said core does not exist.

5. The optical coupler according to claim 1, wherein a distance between the core of said first optical fiber and the core of said second optical fiber is such that the light diffracted by the Bragg diffraction grating of said first optical fiber enters almost entirely into the core of the second optical fiber without widening.

6. A fiber-type optical coupler comprising:

first and second optical fibers for coupling light from one optical fiber to another, wherein said first and second optical fibers each have a core having a slanting Bragg diffraction grating, wherein light diffracted from the Bragg diffraction grating of the core of said first optical fiber is coupled to the core of the Bragg diffraction grating of said second optical fiber, and wherein a distance between the core of said first optical fiber and the core of said second optical fiber is such that the light diffracted by the Bragg diffraction grating of the first optical fiber enters almost entirely into the core of the second optical fiber without widening.

7. The optical coupler according to claim 6, wherein said first and second optical fibers are each substantially D-shaped having a flat surface and a curved surface so that respective flat surfaces are facing each other.

8. The optical coupler according to claim 7, wherein each said core is exposed to air only at each said flat surface.

* * * * *